United States Patent
Alshina et al.

(10) Patent No.: US 10,931,971 B2
(45) Date of Patent: Feb. 23, 2021

(54) METHOD AND APPARATUS FOR ENCODING AND DECODING 360-DEGREE IMAGE

(71) Applicant: SAMSUNG ELECTRONICS CO., LTD., Suwon-si (KR)

(72) Inventors: Elena Alshina, Seoul (KR); Vladyslav Zakharchenko, Seoul (KR); Alexander Alshin, Seoul (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/474,389

(22) PCT Filed: Dec. 27, 2017

(86) PCT No.: PCT/KR2017/015525
§ 371 (c)(1),
(2) Date: Jun. 27, 2019

(87) PCT Pub. No.: WO2018/124720
PCT Pub. Date: Jul. 5, 2018

(65) Prior Publication Data
US 2019/0342577 A1 Nov. 7, 2019

Related U.S. Application Data

(60) Provisional application No. 62/439,197, filed on Dec. 27, 2016.

(51) Int. Cl.
*H04N 19/00* (2014.01)
*H04N 19/597* (2014.01)
*H04N 19/46* (2014.01)

(52) U.S. Cl.
CPC .......... *H04N 19/597* (2014.11); *H04N 19/46* (2014.11)

(58) Field of Classification Search
CPC .... H04N 13/00; H04N 19/184; H04N 19/597; H04N 19/46
See application file for complete search history.

(56) References Cited

U.S. PATENT DOCUMENTS

| | | | |
|---|---|---|---|
| 9,436,973 B2 | 9/2016 | Aoki et al. | |
| 2012/0051666 A1* | 3/2012 | Minakawa | G06T 3/0018 382/295 |

(Continued)

FOREIGN PATENT DOCUMENTS

| | | |
|---|---|---|
| JP | 4355535 B2 | 11/2009 |
| KR | 10-1408426 B1 | 6/2014 |

(Continued)

OTHER PUBLICATIONS

Lucia et al. "MPD signaling of 360 content properties for VR applications". May 2016. (Year: 2016).*

(Continued)

*Primary Examiner* — Zhihan Zhou
(74) *Attorney, Agent, or Firm* — Sughrue Mion, PLLC

(57) ABSTRACT

Provided are a method and apparatus for encoding or decoding a 360-degree image. According to an image decoding method and apparatus according to an embodiment, an original 360-degree image is reconstructed by acquiring image data from a bitstream, decoding a projection image of a 360-degree image from the image data, converting the projection image into the 360-degree image, acquiring rotation information of the 360-degree image from the bitstream, and rotating the 360-degree image based on the rotation information.

13 Claims, 24 Drawing Sheets

(56) References Cited

U.S. PATENT DOCUMENTS

| | | | | |
|---|---|---|---|---|
| 2014/0267593 | A1* | 9/2014 | Kim | H04N 5/23238 348/36 |
| 2015/0172544 | A1* | 6/2015 | Deng | G06T 9/001 348/36 |
| 2016/0078590 | A1* | 3/2016 | Aoki | G06T 5/006 382/275 |
| 2017/0323423 | A1* | 11/2017 | Lin | H04N 13/139 |
| 2018/0332305 | A1* | 11/2018 | Lin | H04N 19/184 |
| 2019/0108612 | A1 | 4/2019 | Vladyslav et al. | |
| 2019/0200023 | A1* | 6/2019 | Hanhart | H04N 19/167 |
| 2020/0084428 | A1* | 3/2020 | Oh | H04N 21/2343 |

FOREIGN PATENT DOCUMENTS

| | | |
|---|---|---|
| KR | 10-2014-0112909 A | 9/2014 |
| KR | 10-2015-0010752 A | 1/2015 |
| WO | 2017175910 A1 | 10/2017 |

OTHER PUBLICATIONS

Communication dated Nov. 7, 2019, issued by the European Patent Office in counterpart European Application No. 17887246.1.

Philippe Hanhart et al., "AHG8: High level syntax extensions for signaling of 360-degree video information", Joint Video Exploration Team (JVET) of ITU-T SG 16 WP 3 and ISO/IEC JTC 1/SC 29/WG 11, 4th meeting: Ghengdu, CCN, 15-21 Oct. 6, 2016, Document JVET-D0093, XP30150330A, pp. 1-6 (6 pages total).

Lucia D'Acunto and Emmanuel Thomas, "MPD Signalling of 360 Content Properties for VR Applications", International Organization for Standardization, Coding of Moving Pictures and Audio, ISO/IEC JTC1/SC29/WG11 MPEG2016/m38605, May 25, 2016, Geneva, CH, XP30066957A (16 pages total).

Eric Yip et al., "OMAF: Overall architecture of OMAF", International Organization for Standardization, Coding of Moving Pictures and Audio, ISO/IEC JTC1/SC29/WG11 MPEG2016/M39359rl, Oct. 17, 2016, Chengdu, China, XP30067705A (3 pages total).

Schuyler Quackenbush, "Audio Contribution to Omnidirectional Media Application Format", International Organization for Standardization, Coding of Moving Pictures and Audio, ISO/IEC JTC1/SC29/WG11, ISO/IEC JTC1/SC29/WG11 m39276, Oct. 12, 2016, Chengdu, CN, XP30067622A (42 pages total).

International Search Report (PCT/ISA/210), issued by International Searching Authority in corresponding International Application No. PCT/KR2017/015525, dated Apr. 17, 2018.

Written Opinion (PCT/ISA/237) issued by the International Searching Authority in corresponding International Application No. PCT/KR2017/015525, dated Apr. 17, 2018.

* cited by examiner

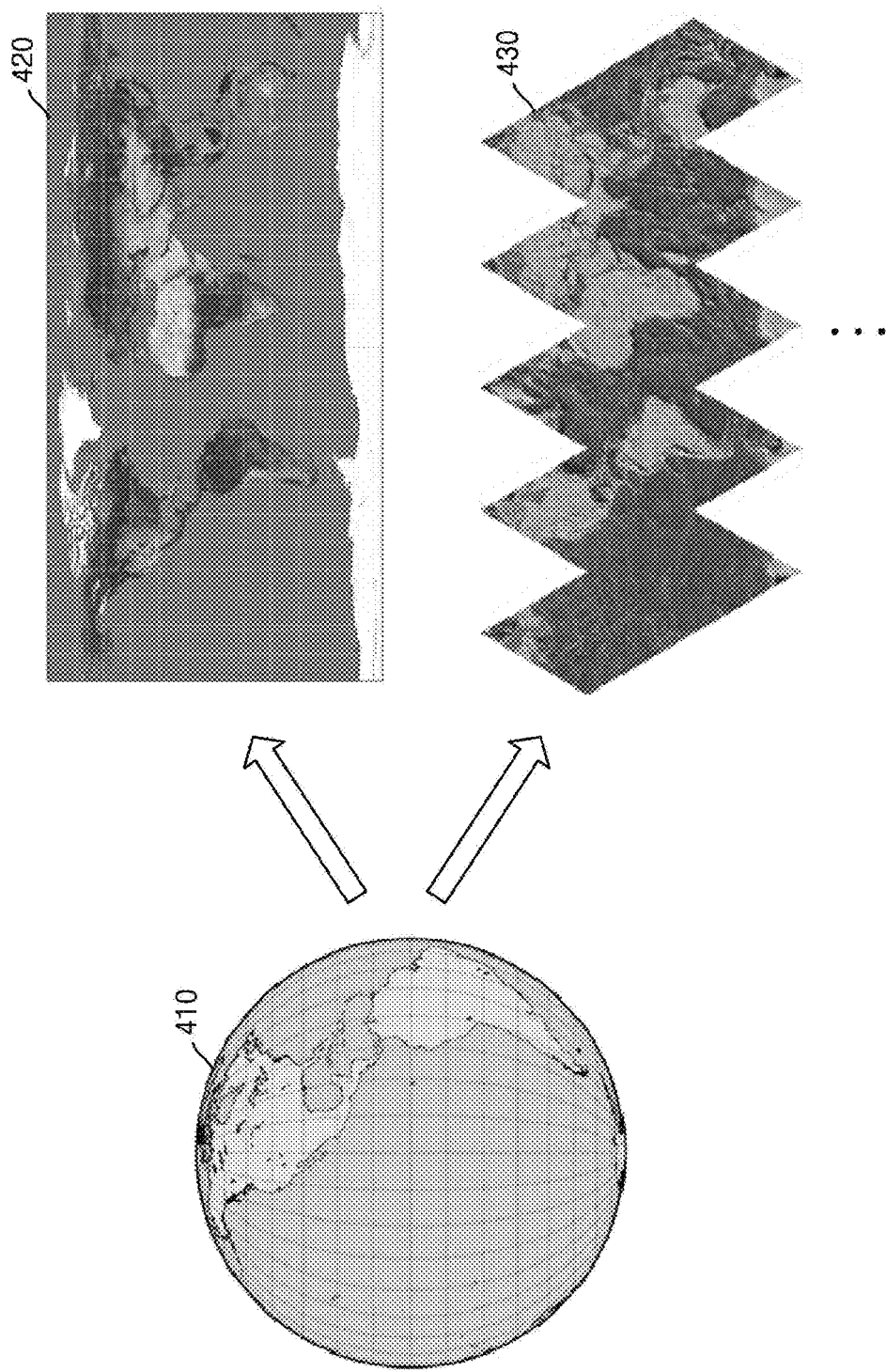

FIG. 7A

| video_parameter_set_rbsp( ) { | Descriptor |
|---|---|
| ... | |
| vps_360_extension_flag | u(1) |
| if( vps_360_extension_flag ) | |
| vps_360_extension( ) | |
| ... | |
| } | |

| vps_360_extension ( ) { | Descriptor |
|---|---|
| vps_360_origin_point_shift_flag | ue(1) |
| if(vps_360_origin_point_shift_flag) { | |
| vps_360_rotation | ue(v) |
| } | |
| } | |

FIG. 7B

| video_parameter_set_rbsp( ) { | Descriptor |
|---|---|
| ... | |
| vps_360_extension_flag | u(1) |
| if( vps_360_extension_flag ) | |
| vps_360_extension( ) | |
| ... | |
| } | |

| vps_360_extension ( ) { | Descriptor |
|---|---|
| vps_360_origin_point_shift_flag | ue(1) |
| if(vps_360_origin_point_shift_flag) { | |
| vps_360_rotation_latitude | ue(v) |
| vps_360_rotation_longitude | ue(v) |
| } | |
| } | |

FIG. 7C

| pic_parameter_set_rbsp( ) { | Descriptor |
|---|---|
| ... | |
| pps_360_extension_flag | u(1) |
| if( pps_360_extension_flag ) | |
|     pps_360_extension( ) | |
| } | |
| ... | |
| } | |

| pps_360_extension ( ) { | Descriptor |
|---|---|
| pps_360_delta_shift_present_flag_latitude | ue(1) |
| if(pps_360_delta_shift_flag_latitude) { | |
|     pps_360_delta_rotation_latitude | ue(v) |
| } | |
| pps_360_delta_shift_present_flag_longitude | ue(1) |
| if(pps_360_delta_shift_flag_longitude) { | |
|     pps_360_delta_rotation_longitude | ue(v) |
| } | |
| } | |

FIG. 7D

| vr_info (payloadSize) { | Descriptor |
|---|---|
|   vr_info_type | |
|   ... | |
|   vr_360_rotation_latitude | ue(v) |
|   vr_360_rotation_longitude | ue(v) |
|   ... | |
| } | |

FIG. 11
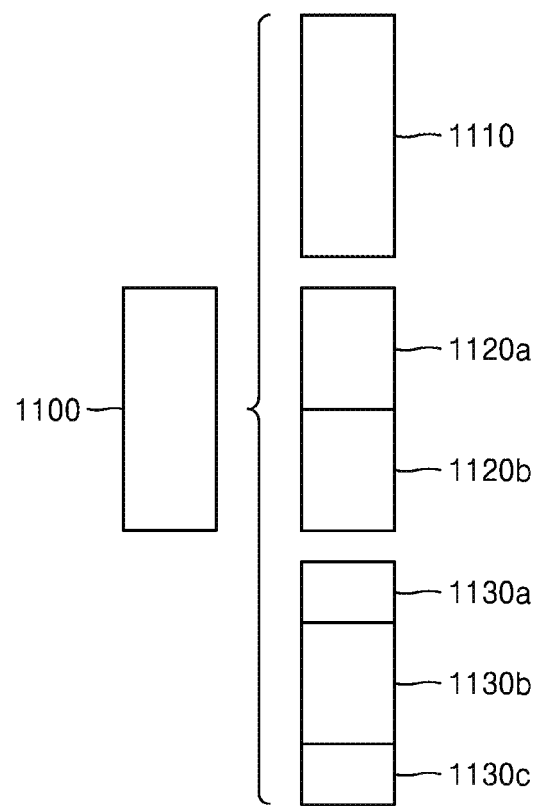
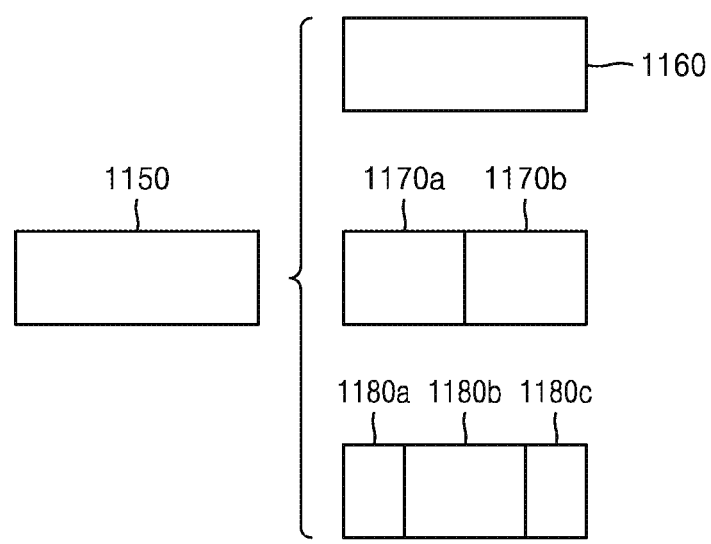

FIG. 20

| BLOCK SHAPE<br>DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND APPARATUS FOR ENCODING AND DECODING 360-DEGREE IMAGE

TECHNICAL FIELD

The present disclosure relates to a method and apparatus for encoding or decoding an image, and more particularly, to a method and apparatus for encoding or decoding a 360-degree image.

BACKGROUND ART

Image data is encoded by a codec based on a predetermined data compression standard, for example, a Moving Picture Experts Group (MPEG) standard, and then stored in the form of a bitstream in a storage medium or transmitted through a communication channel.

With the development and spread of hardware capable of reproducing and storing high-resolution or high-definition image content, the demand for codecs for effectively encoding or decoding high-resolution or high-definition image content is increasing. Encoded image content can be reproduced by being decoded. Recently, methods for effectively compressing such high-resolution or high-definition image content have been performed. For example, a method for effectively compressing an image to be encoded by processing the image by an arbitrary method has been performed.

Also, with the recent development of virtual reality (VR)-related technology and apparatuses, VR apparatuses using VR-related technology and apparatuses are in the spotlight. Such VR apparatuses are being widely applied to various fields, such as entertainment, education, office work, and medical treatment.

VR images displayed on a VR apparatus move according to eyes of a user wearing a VR display, and therefore, the VR images should include all surrounding images around the user. That is, VR images that are provided by a VR apparatus are images corresponding to all directions around a user, that is, 360-degree images. Accordingly, the interest in processing 360-degree images is increasing in line with interest in VR apparatuses.

DESCRIPTION OF EMBODIMENTS

Technical Problem

Provided are a method and apparatus for encoding or decoding a 360-degree image.

Solution to Problem

An image decoding method according to an embodiment includes: decoding a projection image of a 360-degree image from an image data; converting the projection image into the 360-degree image; acquiring rotation information of the 360-degree image from the bitstream; and rotating the 360-degree image based on the rotation information to reconstruct an original 360-degree image.

An image decoding apparatus according to an embodiment includes: a data acquirer configured to acquire image data and rotation information of a 360-degree image from a bitstream; a decoder configured to decode a projection image of a 360-degree image from the image data; and a reconstructor configured to convert the projection image into the 360-degree image and to rotate the 360-degree image based on the rotation information to reconstruct an original 360-degree image.

An image encoding method according to an embodiment includes: determining a predetermined angle for rotating an original 360-degree image; rotating the original 360-degree image based on the predetermined angle; converting the rotated 360-degree image into a projection image; encoding the projection image; and generating a bitstream including image data for the encoded projection image and information about the predetermined angle.

An image encoding apparatus according to an embodiment includes: a converter configured to determine a predetermined angle for rotating an original 360-degree image, to rotate the original 360-degree image based on the predetermined angle, and to convert the rotated 360-degree image into a projection image; an encoder to encode the projection image; and a bitstream generator configured to generate a bitstream including image data for the encoded projection image and information about the predetermined angle.

BRIEF DESCRIPTION OF DRAWINGS

FIG. 4 shows projection images generated by projecting a 360-degree image by using projection methods according to various embodiments.

FIGS. 7A to 7D show various embodiments of syntax related to rotations of a 360-degree image.

FIG. 11 illustrates a process of determining at least one coding unit by splitting a non-square coding unit, according to an embodiment.

FIG. 20 illustrates a process of determining a depth of a coding unit as a shape and size of the coding unit change, when the coding unit is recursively split such that a plurality of coding units are determined, according to an embodiment.

BEST MODE

Figure 1:
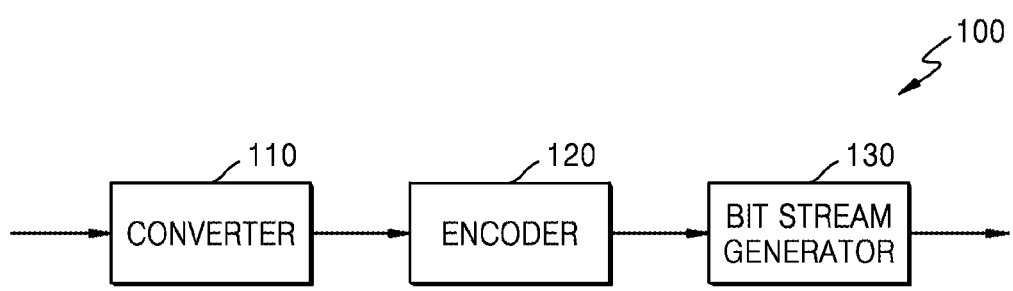
FIG. 1 is a schematic block diagram of an image encoding apparatus 100 according to an embodiment.

An image decoding method according to an embodiment includes: decoding a projection image of a 360-degree image from an image data; converting the projection image into the 360-degree image; acquiring rotation information of the 360-degree image from the bitstream; and rotating the 360-degree image based on the rotation information to reconstruct an original 360-degree image.

In the image encoding method according to an embodiment, the projection image may be an image obtained by projecting the 360-degree image by using any one of equirectangular projection, icosahedral projection, cubemap projection, octahedron projection, and rotated sphere projection.

In the image decoding method according to an embodiment, the rotation information may represent a horizontal angle and a vertical angle with respect to a center of the 360-degree image.

In the image decoding method according to an embodiment, the rotation information may be total 8 bits including 5 bits representing the horizontal angle and 3 bits representing the vertical angle.

Also, in the image decoding method according to an embodiment, the rotation information may have been stored in a video parameter set or a sequence parameter set in the bitstream.

Also, in the image decoding method according to an embodiment, the rotation information may have been stored in supplemental enhancement information (SEI) in the bitstream.

Also, the image decoding method according to an embodiment may further include: acquiring information about a rotation change amount of the 360-degree image from the bitstream, wherein the 360-degree image may rotate based on the rotation information and the information about the rotation change amount.

Also, in the image decoding method according to an embodiment, the information about the rotation change amount may have been stored in a picture parameter set in the bitstream.

Also, the image decoding method according to an embodiment may further include: acquiring information about whether the 360-degree image has rotated; and determining whether to acquire the rotation information based on the information about whether the 360-degree image has rotated.

An image decoding apparatus according to an embodiment includes: a data acquirer configured to acquire image data and rotation information of a 360-degree image from a bitstream; a decoder configured to decode a projection image of the 360-degree image from the image data; and a reconstructor configured to convert the projection image into the 360-degree image, to rotate the 360-degree image based on the rotation information, and to reconstruct an original 360-degree image.

An image encoding method according to an embodiment includes: determining a predetermined angle for rotating an original 360-degree image; rotating the original 360-degree image based on the predetermined angle; converting the rotated 360-degree image into a projection image; encoding the projection image; and generating a bitstream including image data for the encoded projection image and information about the predetermined angle.

Also, in the image encoding method according to an embodiment, the predetermined angle may include a horizontal angle and a vertical angle with respect to a center of the 360-degree image.

Also, in the image encoding method according to an embodiment, the determining of the predetermined angle for rotating the original 360-degree image may include: applying possible rotation angles to the original 360-degree image to rotate the original 360-degree image; converting each of 360-degree images rotated by the respective possible rotation angles into a projection image; calculating encoding efficiency of the converted projection image; and determining the predetermined angle from among the possible rotation angles based on the calculation result.

An image encoding apparatus according to an embodiment includes: a converter configured to determine a predetermined angle for rotating an original 360-degree image, to rotate the original 360-degree image based on the predetermined angle and to convert the rotated 360-degree image into a projection image; an encoder configured to encode the projection image; and a bitstream generator configured to generate a bitstream including image data for the encoded projection image and information about the predetermined angle.

MODE OF DISCLOSURE

Advantages and features of disclosed embodiments and a method of achieving the advantages and features will be apparent by referring to embodiments described below in connection with the accompanying drawings. However, the present disclosure is not restricted by these embodiments but can be implemented in many different forms, and the present embodiments are provided to complete the present disclosure and to allow those having ordinary skill in the art to understand the scope of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise.

It will be understood that when a certain part "includes" a certain component, the part does not exclude another component but can further include another component, unless the context clearly dictates otherwise. As used herein, the terms "portion", "module", or "unit" refers to a unit that can perform at least one function or operation, and may be implemented as a software or hardware component such as a Field Programmable Gate Array (FPGA) or an Application Specific Integrated Circuit (ASIC). However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

Hereinafter, an "image" may represent a static image such as a still image of video, or a moving image, that is, a dynamic image such as video itself.

Hereinafter, a "sample", which is data assigned to a sampling location of an image, means data that is to be processed. For example, pixel values in an image of a spatial region and convert coefficients on a convert region may be samples. A unit including at least one of the samples may be defined as a block.

Hereinafter, embodiments will be described in detail with reference to the accompanying drawings so that the present disclosure may be readily implemented by one of ordinary skill in the technical field to which the present disclosure pertains. Also, in the drawings, parts irrelevant to the description will be omitted for the simplicity of explanation.

Hereinafter, an image encoding apparatus, an image decoding apparatus, an image encoding method, and an image decoding method, according to embodiments, will be described with reference to FIGS. 1 to 23. A method and apparatus for encoding or decoding a 360-degree image, according to an embodiment, will be described with reference to FIGS. 1 to 9, below, and a method for determining a data unit that is used in a process of decoding an image by an image decoding apparatus 200 according to an embodiment will be described with reference to FIGS. 10 to 23, below.

Hereinafter, a method and apparatus for encoding or decoding a 360-degree image, according to an embodiment of the present disclosure, will be described with reference to FIGS. 1 to 9.

FIG. 1 is a schematic block diagram of an image encoding apparatus 100 according to an embodiment.

The image encoding apparatus 100 according to an embodiment may include a converter 110, an encoder 120, and a bitstream generator 130.

According to an embodiment, the converter 110 may determine a predetermined angle for rotating an original 360-degree image.

According to an embodiment, by applying possible rotation angles to the original 360-degree image to rotate the original 360-degree image, converting each of 360-degree images rotated by the respective rotation angles into a projection image, calculating encoding efficiency of the converted projection image, and determining a predetermined angle from among the possible rotation angles based on the calculation results, a predetermined angle for rotating the original 360-degree image may be determined.

According to another embodiment, by applying possible rotation angles to the original 360-degree image to rotate the original 360-degree image, converting each of 360-degree images rotated by the respective rotation angles into a projection image, calculating image quality of the converted projection image, and determining a predetermined angle from among the possible rotation angles based on the calculation results, a predetermined angle for rotating the original 360-degree image may be determined.

According to still another embodiment, by calculating encoding efficiency and image quality of projection images converted according to rotation angles of the original 360-degree image, a predetermined angle for rotating the original 360-degree image may be determined in consideration of both the calculated encoding efficiency and image quality.

According to an embodiment, the predetermined angle may include a horizontal angle and a vertical angle with respect to a center of the 360-degree image.

According to an embodiment, the converter 110 may rotate the original 360-degree image based on the predetermined angle, and convert the rotated 360-degree image into a projection image. According to an embodiment, the projection image may be an image obtained by projecting the 360-degree image using any one of equirectangular projection, icosahedral projection, cubemap projection, octahedron projection, and rotated sphere projection.

According to an embodiment, the bitstream generator 130 may generate a bitstream including image data for an encoded projection image and information about the predetermined angle. According to an embodiment, the information about the predetermined angle may be stored in a video parameter set or a sequence parameter set in the bitstream.

Figure 2:
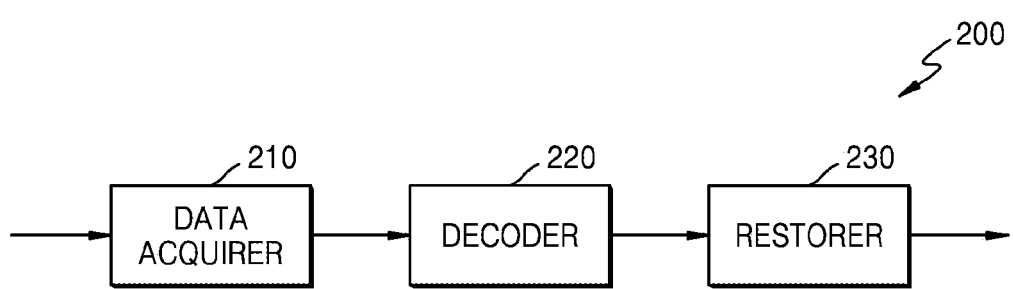
FIG. 2 is a schematic block diagram of an image decoding apparatus 200 according to an embodiment.

FIG. 2 is a schematic block diagram of an image decoding apparatus 200 according to an embodiment.

Referring to FIG. 2, the image decoding apparatus 200 according to an embodiment of the present disclosure may include a data acquirer 210, a decoder 220, and a reconstructor 230.

The data acquirer 210 according to an embodiment may parse a bitstream received by the image decoding apparatus 200 to acquire image data and rotation information of a 360-degree image, and output the image data and the rotation information of the 360-degree image to the decoder 220 and the reconstructor 230.

According to an embodiment, the rotation information may represent a horizontal angle and a vertical angle with respect to a center of the 360-degree image. According to an embodiment, the rotation information may be total 8 bits including 5 bits representing the horizontal angle and 3 bits representing the vertical angle. According to an embodiment, the rotation information may be acquired from a video parameter set or a sequence parameter set in the bitstream. According to another embodiment, the rotation information may be acquired from supplemental enhancement information (SEI) in the bitstream.

According to an embodiment, in addition to the rotation information, information about a rotation change amount of the 360-degree image may be further acquired from the bitstream. The information about the rotation change amount may be acquired from a picture parameter set.

According to an embodiment, information about whether the 360-degree image has rotated may be further acquired, and whether to acquire the rotation information may be determined according to the information about whether the 360-degree image has rotated.

The decoder 220 according to an embodiment may decode a projection image of the 360-degree image from the image data.

The reconstructor 230 according to an embodiment may convert the projection image into a 360-degree image. According to an embodiment, the projection image may be an image obtained by projecting the 360-degree image using any one of equirectangular projection, icosahedral projection, cubemap projection, octahedron projection, and rotated sphere projection. However, projection methods are not limited to the above-mentioned methods, and other various projection methods may be used. According to an embodiment, the projection image may be a planar rectangular image.

The reconstructor 230 according to an embodiment may rotate the 360-degree image based on the rotation information to reconstruct an original 360-degree image. According to an embodiment, the 360-degree image may rotate based on both the rotation information and the information about the rotation change amount.

Figure 3:
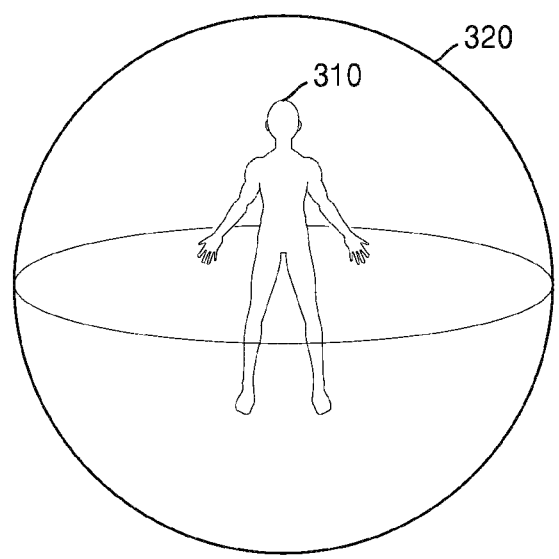
FIG. 3 shows a 360-degree image according to an embodiment.

FIG. 3 shows a 360-degree image according to an embodiment.

As shown in FIG. 3, a 360-degree image 320 may be an image representing an ambient environment surrounding a predetermined location 310 at 360 degrees with the predetermined location 310 at the center. According to an embodiment, the 360-degree image 320 may be in the shape of a sphere. When a user wears a VR apparatus, an image representing an ambient environment surrounding the user at 360 degrees in VR may be a 360-degree image. The VR apparatus may provide a 360-degree image to the user so as to provide, even when the user wearing the VR apparatus moves or turns his/her eyes in VR, an appropriate image for the corresponding situation.

FIG. 4 shows projection images generated by projecting a 360-degree image by using projection methods according to various embodiments.

Because it is difficult to encode a 360-degree image itself, a 360-degree image may be converted into a planar image for encoding/decoding. Referring to FIG. 3, a 360-degree image 410 as described above may be projected through various projection methods to be converted into a planar image. As shown in FIG. 4, the 360-degree image 410 may be projected by using the equirectangular projection to be converted into a projection image 420 in the shape of a rectangle. Also, the 360-degree image 410 may be projected by using the icosahedral projection to be converted into a projection image 420 in the shape of a planar figure of an icosahedron. Meanwhile, although not shown in FIG. 4, projection methods for generating a projection image are not limited to the equirectangular projection and icosahedral projection mentioned above, and various projection methods may be used. Projection methods according to various embodiments may be octahedron projection, cubemap projection and rotated sphere projection, and a projection image may be generated in different shapes according to projection methods. A projection image generated according to the rotated sphere projection may be in the shape of a rectangle having an aspect ratio of 3:2, like the cubemap projection, and the projection image may be configured with two symmetrical successive segments divided vertically. Edge regions of each segment may remain as they are or be gray-processed in the shape of arcs. According to an embodiment, a projection image generated by using various projection methods may be reconfigured to a rectangular shape by adding spaces.

Figure 5A:
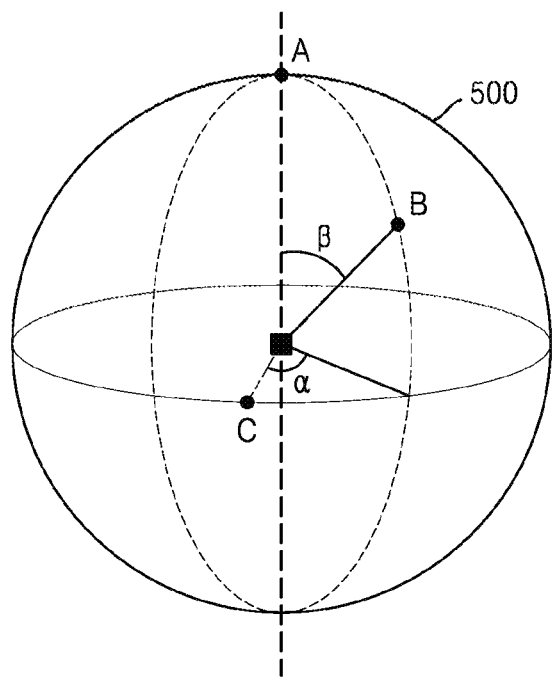
FIGS. 5A and 5B show a predetermined angle for rotating a 360-degree image and a projection image corresponding to the 360-degree image, according to an embodiment.
Figure 5B:
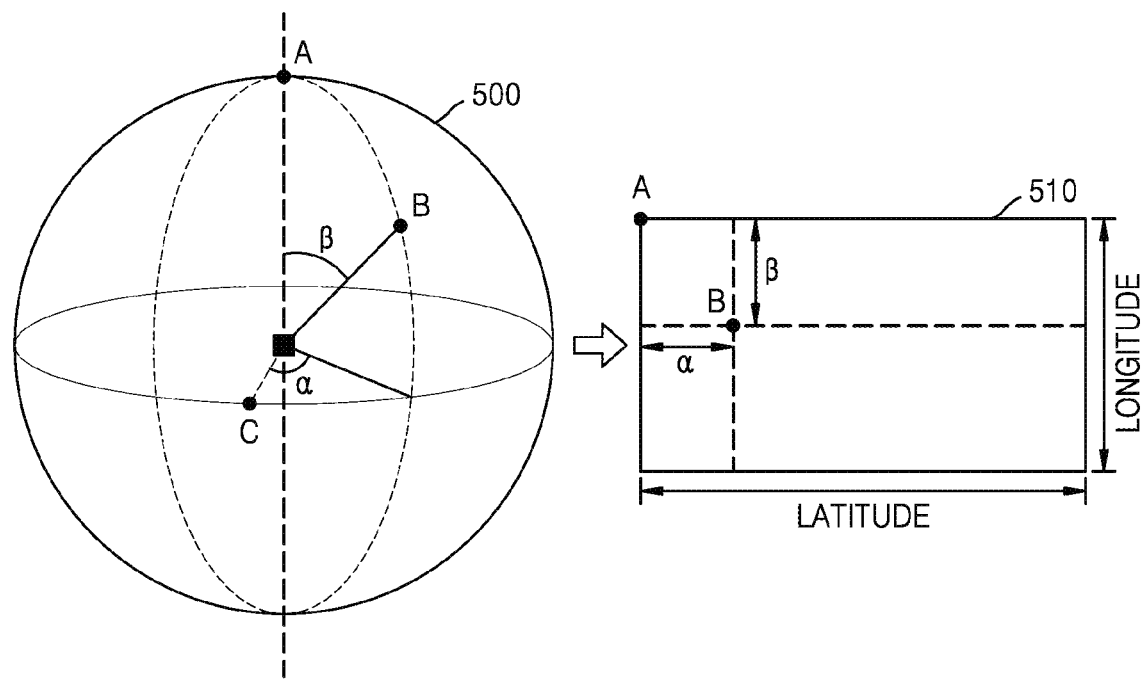

FIGS. 5A and 5B show a predetermined angle for rotating a 360-degree image according to an embodiment and a projection image corresponding to the 360-degree image.

As shown in FIG. 5A, a 360-degree image 500 may have an origin A at the top. To rotate the 360-degree image 500, a predetermined point B on the 360-degree image 500 may be selected. A predetermined angle corresponding to the selected predetermined point B may be determined. The predetermined angle may include a horizontal angle and a vertical angle with respect to a center of the 360-degree image.

According to an embodiment, on a horizontal plane passing the center of the 360-degree image 500, a horizontal angle α formed between the predetermined point B and a reference point C representing a front side with respect to the center may be determined. The horizontal angle α may be determined in the range of 0 degrees to 360 degrees according to the predetermined point B.

According to an embodiment, a vertical angle β formed by a straight line passing the predetermined point B and the center with respect to a straight line passing the center of the 360-degree image 500 and the origin A may be determined. The vertical angle β may be determined in the range of 0 degrees to 180 degrees according to the predetermined point B.

For encoding/decoding of the 360-degree image, information about the predetermined angle may be signaled through a bitstream as rotation information of the 360-degree image 500. Various embodiments of syntax for the rotation information of the 360-degree image 500 will be described in detail with reference to FIGS. 7A to 7D.

As shown in FIG. 5B, a relation between the origin A and the predetermined point B on the 360-degree image 500 described above with reference to FIG. 5A may be expressed as a relation between an origin A and a predetermined point B on a projection image 510 corresponding to the 360-degree image 500. The horizontal angle α and the vertical angle β with respect to the center of the 360-degree image 500 may respectively correspond to a horizontal distance and a vertical distance between the origin A and the predetermined point B on the projection image 510. Also, a horizontal length and a vertical length of the projection image 510 may respectively correspond to an entire longitude and an entire latitude of the 360-degree image 500. When a predetermined point having a longitude and a latitude on the 360-degree image 500 is selected, a predetermined point B having a horizontal-axis coordinate corresponding to the longitude and a vertical-axis coordinate corresponding to the latitude on the corresponding projection image 510 may be selected.

Figure 6A:
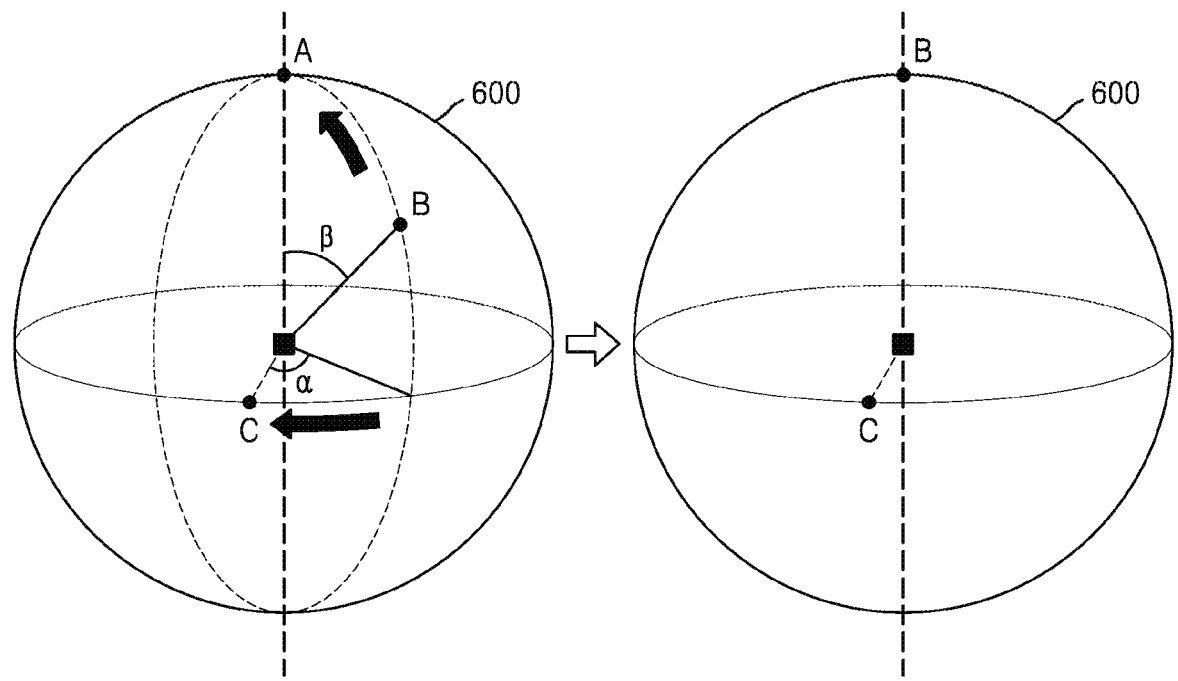
FIGS. 6A and 6B show a rotated 360-degree image and a projection image corresponding to the rotated 360-degree image, according to an embodiment.
Figure 6B:
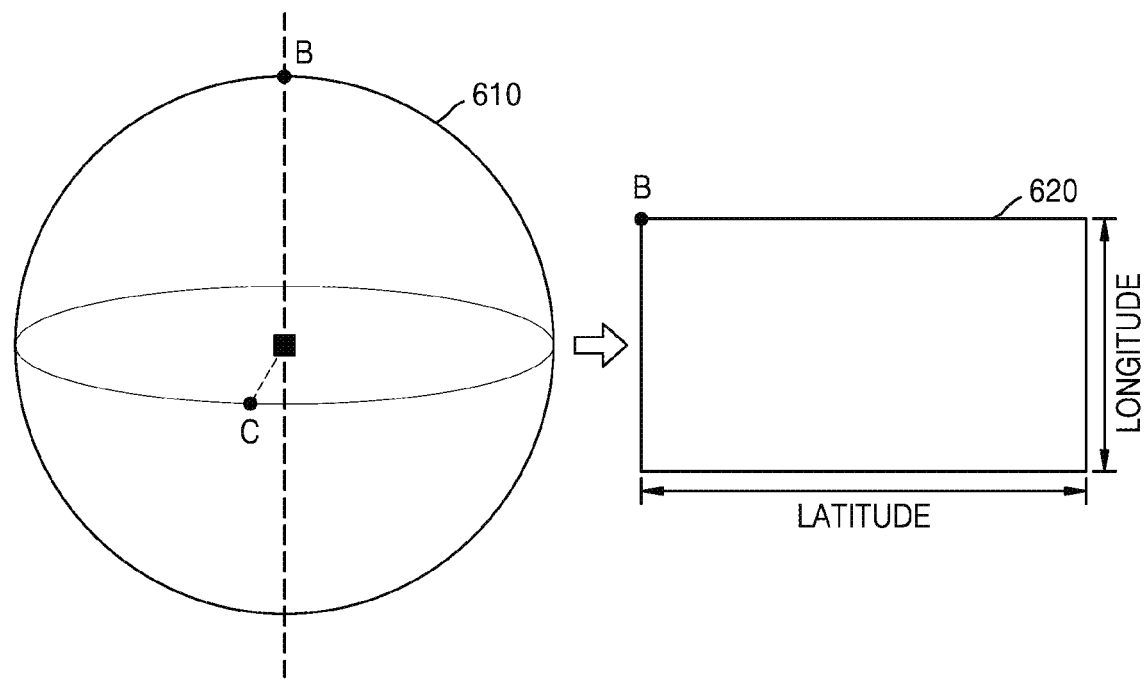

FIGS. 6A and 6B show a 360-degree image rotated according to an embodiment and a projection image corresponding to the rotated 360-degree image.

As described above with reference to FIGS. 5A and 5B, to rotate the 360-degree image 500, a predetermined point B on the 360-degree image 500 may be selected, and a horizontal angle α and a vertical angle β with respect to the center of the 360-degree image 500 may be selected as predetermined angles corresponding to the selected predetermined point B.

As shown in FIG. 6A, a 360-degree image 600 may rotate based on a horizontal angle α and a vertical angle β. The 360-degree image 600 may rotate by the horizontal angle α by using a straight line passing a center of the 360-degree image 600 and an origin A as a rotation axis. The 360-degree image 600 may rotate by the vertical angle β such that the predetermined point B arrives at the origin A located at the top of the 360-degree image 600. In a 360-degree image 610 obtained by rotating the 360-degree image 600, the predetermined point B may become a new origin at the top of the 360-degree image 610. By the rotation, a pixel value corresponding to a reference point C representing a front side may change. However, content of the 360-degree image 600 may not change although the 360-degree image 600 rotates.

As shown in FIG. 6B, the predetermined point B may become a new origin at a left upper edge on a projection image 620 corresponding to the rotated 360-degree image 610. Although the content of the 360-degree image 600 does not change when the 360-degree image 600 rotates, the projection image 620 corresponding to the rotated 360-degree image 610 may be different from content of the projection image 510 before the 360-degree image 600 rotates. For example, a projection image may be an image obtained by projecting a 360-degree image using the equirectangular projection. In this case, the projection image may show more significant distortions of content with respect to the 360 degree image toward upper and lower areas from the center. Because content of a projection image that is to be encoded/decoded changes depending on a rotation of a 360 degree image, an encoding rate may vary depending on a rotation of the 360 degree image according to a selection of a predetermined point, and the image encoding apparatus 100 may compare encoding rates for rotations of the 360 degree image according to predetermined angles to select an optimal rotation angle.

FIGS. 7A to 7D show various embodiments of syntax related to rotations of a 360-degree image.

According to an embodiment, a bitstream may be configured with a plurality of network abstraction layer (NAL) units, and at least one of the NAL units may be a video parameter set raw byte sequence payload (RBSP) region. Information included in the video parameter set may be applied to an intra random access point (IRAP) picture and pictures in a coded video sequence (CVS) including subsequent pictures which are not an RAP picture, according to a decoding order. The information included in the video parameter set may be applied to sequence levels of the pictures.

As shown in FIG. 7A, according to an embodiment, a 1-bit flag "vps_360_extension_flag" indicating whether an image to be decoded is a projection image of a 360-degree image may be acquired from a video parameter set RBSP region. When a value of "vps_360_extension_flag" is 1, syntax "vps_360_extension( )" may be called so that information related to the 360-degree image may be acquired subsequently.

As shown in FIG. 7A, when the syntax "vps_360_extension( )" is called, a 1-bit flag "vps_360_origin_point_shift_flag" representing information about whether the 360-degree image has rotated may be acquired, and when "vps_360_origin_point_shift_flag" is 1, "vps_360_rotation" representing rotation information of the 360-degree image may be acquired.

According to an embodiment, "vps_360_rotation" representing the rotation information of the 360-degree image may be total 8 bits including 5 bits representing a horizontal angle with respect to a center of the 360-degree image and 3 bits representing a vertical angle with respect to the center of the 360-degree image.

Referring to FIG. 7B, as shown in FIG. 7A, "vps_360_extension_flag" may be acquired from a video parameter set RBSP region, and "vps_360_origin_point_shift_flag" may be acquired from called syntax "vps_360_extension( )".

According to another embodiment, as shown in FIG. 7B, "vps_360_rotation_latitude" representing a vertical angle with respect to the center of the 360-degree image and "vps_360_rotation_longitude" representing a horizontal angle with respect to the center of the 360-degree image may be acquired separately, instead of "vps_360_rotation" representing rotation information of the 360-degree image.

According to an embodiment, the 360-degree image may rotate based on the acquired rotation information of the 360-degree image, so that an original 360-degree image may be reconstructed.

According to an embodiment, at least one of the NAL units constructing the bitstream may be a picture parameter set RBSP region. Information included in the picture parameter set may be applied to a predetermined number of pictures.

As shown in FIG. 7C, according to an embodiment, a 1-bit flag "pps_360_extension_flag" indicating whether an image to be decoded is a projection image of a 360-degree image may be acquired from the picture parameter set RBSP region. When a value of "pps_360_extension_flag" is 1, syntax "pps_360_extension( )" may be called so that information related to the 360-degree image may be acquired subsequently.

As shown in FIG. 7C, when the syntax "pps_360_extension( )" is called, a 1-bit flag "pps_360_delta_shift_present_flag_latitude" representing information about whether a rotation change amount with respect to a vertical angle of the 360-degree image exists and a 1-bit flag "pps_360_delta_shift_present_flag_longitude" representing information about whether a rotation change amount with respect to a horizontal angle of the 360-degree image exists may be acquired.

As shown in FIG. 7C, when "pps_360_delta_shift_present_flag_latitude" is 1, "pps_360_delta_rotation_latitude" representing information about the rotation change amount with respect to the vertical angle of the 360-degree image may be acquired, and when "pps_360_delta_shift_present_flag_longitude" is 1, "pps_360_delta_rotation_longitude" representing information about the rotation change amount with respect to the horizontal angle of the 360-degree image may be acquired.

According to an embodiment, the 360-degree image may rotate according to the acquired rotation information of the 360-degree image, and rotation amounts with respect to some pictures may be adjusted based on the information about the rotation change amount.

As shown in FIG. 7D, according to an embodiment, "vr_360_rotation_latitude" representing a vertical angle with respect to the center of the 360-degree image and "vr_360_rotation_longitude" representing a horizontal angle with respect to the center of the 360-degree image may be acquired from SEI in the bitstream. The SEI may include time information and additional information related to screen display of decoded data.

Figure 8:
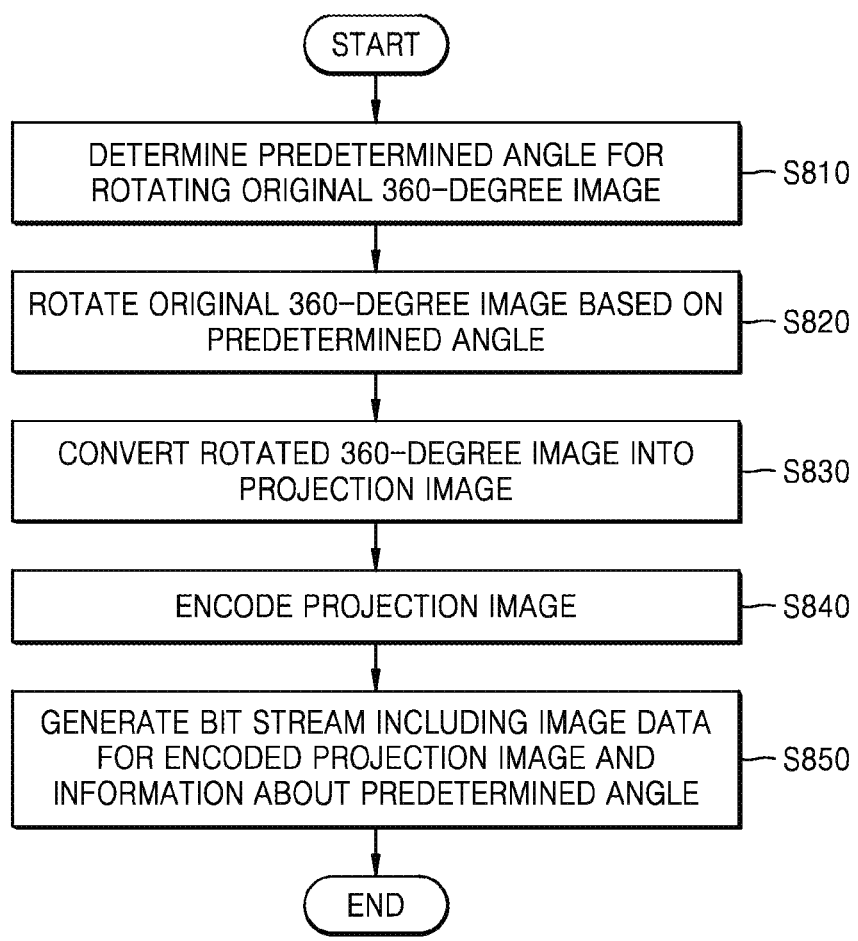
FIG. 8 shows a flowchart for describing an image encoding method according to an embodiment.

FIG. 8 shows a flowchart for describing an image encoding method according to an embodiment.

In an operation S810, a predetermined angle for rotating an original 360-degree image may be determined.

According to an embodiment, by applying possible rotation angles to the original 360-degree image to rotate the original 360-degree image, converting each of 360-degree images rotated by the respective rotation angles into a projection image, calculating encoding efficiency of the converted projection image, and determining a predetermined angle from among the possible rotation angles based on the calculation results, a predetermined angle for rotating the original 360-degree image may be determined.

According to another embodiment, by applying possible rotation angles to the original 360-degree image to rotate the original 360-degree image, converting each of 360-degree images rotated by the respective rotation angles into a projection image, calculating image quality of the converted projection image, and determining a predetermined angle from among the possible rotation angles based on the calculation results, a predetermined angle for rotating the original 360-degree image may be determined.

According to still another embodiment, by calculating encoding efficiency and image quality of projection images converted according to rotation angles of the original 360-degree image, a predetermined angle for rotating the original 360-degree image may be determined in consideration of both the calculated encoding efficiency and image quality.

According to an embodiment, the predetermined angle may include a horizontal angle and a vertical angle with respect to a center of the 360-degree image.

In operations S820 and S830, the original 360-degree image may rotate based on the predetermined angle, and the rotated 360-degree image may be converted into a projection image. According to an embodiment, the projection image may be an image obtained by projecting the 360-degree image by using the equirectangular projection.

In operations S840 and S850, the projection image may be encoded, and a bitstream including image data for the encoded projection image and information about the predetermined angle may be generated. According to an embodiment, the information about the predetermined angle may be stored in a video parameter set or a sequence parameter set in the bitstream.

Figure 9:
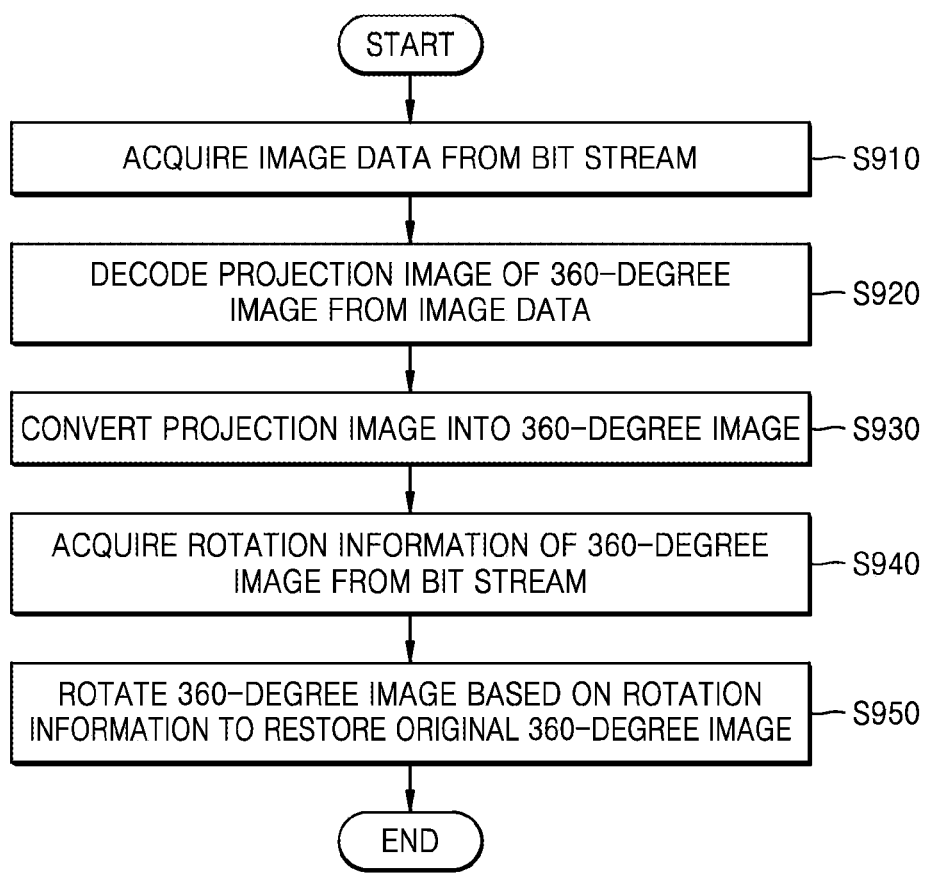
FIG. 9 shows a flowchart for describing an image decoding method according to an embodiment.

FIG. 9 shows a flowchart for describing an image decoding method according to an embodiment.

In operations S910 and S920, image data may be acquired from a bitstream, and a projection image of a 360-degree image may be decoded from the image data.

In an operation S930, the projection image may be converted into the 360-degree image. According to an embodiment, the projection image may be an image obtained by projecting the 360-degree image by using the equirectangular projection. However, projection methods are not limited to the above-mentioned methods, and other various projection methods may be used. According to an embodiment, the projection image may be a planar rectangular image.

In an operation S940, rotation information of the 360-degree image may be acquired from the bitstream. According to an embodiment, the rotation information may represent a horizontal angle and a vertical angle with respect to a center of the 360-degree image. According to an embodiment, the rotation information may be total 8 bits including 5 bits representing the horizontal angle and 3 bits representing the vertical angle. According to an embodiment, the rotation information may be acquired from a video parameter set or a sequence parameter set in the bitstream. According to another embodiment, the rotation information may be acquired from SEI in the bitstream.

According to an embodiment, information about a rotation change amount of the 360-degree image, in addition to the rotation information, may be further acquired from the bitstream. The information about the rotation change amount may be acquired from a picture parameter set.

According to an embodiment, information about whether the 360-degree image has rotated may be further acquired, and whether to acquire the rotation information may be determined based on the information about whether the 360-degree image has rotated.

In an operation S950, the 360-degree image may rotate based on the rotation information, so that an original 360-degree image may be reconstructed. According to an embodiment, the 360-degree image may rotate based on both the rotation information and the information about the rotation change amount.

Hereinafter, a method of determining a data unit of an image according to an embodiment will be described with reference to FIGS. 10 to 23.

Figure 10:
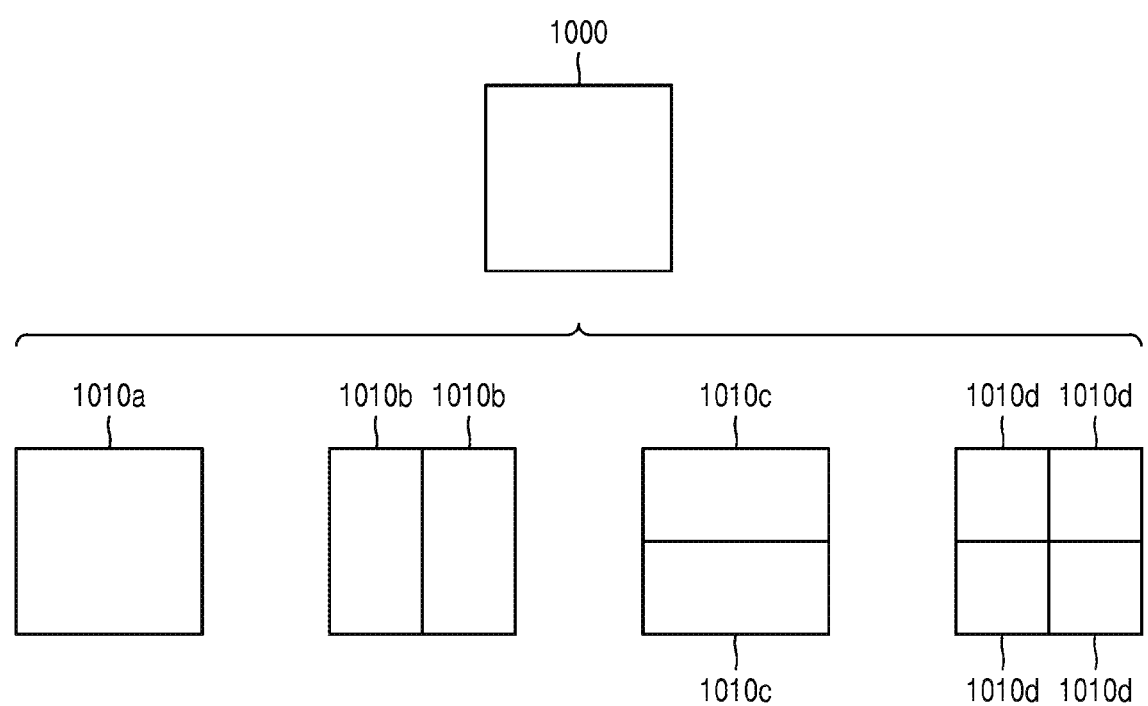
FIG. 10 illustrates a process of determining at least one coding unit by splitting a current coding unit, according to an embodiment.

FIG. 10 illustrates a process, performed by the image decoding apparatus 200, of determining at least one coding unit by splitting a current coding unit, according to an embodiment.

According to an embodiment, the image decoding apparatus 200 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 200.

According to an embodiment, the image decoding apparatus 200 may use the block shape information indicating that the current coding unit has a square shape. For example, the image decoding apparatus 200 may determine whether not to split a square coding unit, whether to vertically split the square coding unit, whether to horizontally split the square coding unit, or whether to split the square coding unit into four coding units, based on the split shape information. Referring to FIG. 10, when the block shape information of a current coding unit 1000 indicates a square shape, a decoder 1030 may determine that a coding unit 1010a having the same size as the current coding unit 1000 is not split, based on the split shape information indicating not to perform splitting, or may determine coding units 1010b, 1010c, or 1010d split based on the split shape information indicating a predetermined splitting method.

Referring to FIG. 10, according to an embodiment, the image decoding apparatus 200 may determine two coding units 1010b obtained by splitting the current coding unit 1000 in a vertical direction, based on the split shape information indicating to perform splitting in a vertical direction. The image decoding apparatus 200 may determine two coding units 1010c obtained by splitting the current coding unit 1000 in a horizontal direction, based on the split shape information indicating to perform splitting in a horizontal direction. The image decoding apparatus 200 may determine four coding units 1010d obtained by splitting the current coding unit 1000 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

FIG. 11 illustrates a process, performed by the image decoding apparatus 200, of determining at least one coding unit by splitting a non-square coding unit, according to an embodiment.

According to an embodiment, the image decoding apparatus 200 may use block shape information indicating that a current coding unit has a non-square shape. The image decoding apparatus 200 may determine whether not to split the non-square current coding unit or whether to split the non-square current coding unit by using a predetermined splitting method, based on split shape information. Referring to FIG. 11, when the block shape information of a current coding unit 1100 or 1150 indicates a non-square shape, the image decoding apparatus 200 may determine that a coding unit 1110 or 1160 having the same size as the current coding unit 1100 or 1150 is not split, based on the split shape information indicating not to perform splitting, or determine coding units 1120a and 1120b, 1130a to 1130c, 1170a and 1170b, or 1180a to 1180c split based on the split shape information indicating a predetermined splitting method. Predetermined splitting methods of splitting a non-square coding unit will be described in detail below in relation to various embodiments.

According to an embodiment, the image decoding apparatus 200 may determine a splitting method of a coding unit by using the split shape information and, in this case, the split shape information may indicate the number of one or more coding units generated by splitting a coding unit. Referring to FIG. 11, when the split shape information indicates to split the current coding unit 1100 or 1150 into two coding units, the image decoding apparatus 200 may determine two coding units 1120a and 1120b, or 1170a and 1170b included in the current coding unit 1100 or 1150, by splitting the current coding unit 1100 or 1150 based on the split shape information.

According to an embodiment, when the image decoding apparatus 200 splits the non-square current coding unit 1100 or 1150 based on the split shape information, the location of a long side of the non-square current coding unit 1100 or 1150 may be considered. For example, the image decoding apparatus 200 may determine a plurality of coding units by dividing a long side of the current coding unit 1100 or 1150, in consideration of the shape of the current coding unit 1100 or 1150.

According to an embodiment, when the split shape information indicates to split a coding unit into an odd number of blocks, the image decoding apparatus 200 may determine an odd number of coding units included in the current coding unit 1100 or 1150. For example, when the split shape information indicates to split the current coding unit 1100 or 1150 into three coding units, the image decoding apparatus 200 may split the current coding unit 1100 or 1150 into three coding units 1130a, 1130b, and 1130c, or 1180a, 1180b, and 1180c. According to an embodiment, the image decoding apparatus 200 may determine an odd number of coding units included in the current coding unit 1100 or 1150, and not all the determined coding units may have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. In other words, coding units that may be determined by splitting the current coding unit 1100 or 1150 may have various types and sizes.

According to an embodiment, when the split shape information indicates to split a coding unit into an odd number of blocks, the image decoding apparatus 200 may determine an odd number of coding units included in the current coding unit 1100 or 1150, and may put a predetermined restriction on at least one coding unit from among the odd number of coding units generated by splitting the current coding unit 1100 or 1150. Referring to FIG. 11, the image decoding apparatus 200 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by splitting the current coding unit 1100 or 1150. For example, the image decoding apparatus 200 may restrict the coding unit 1130b or 1180b at the center location to be no longer split or to be split only a predetermined number of times, unlike the other coding units 1130a and 1130c, or 1180a and 1180c.

Figure 12:
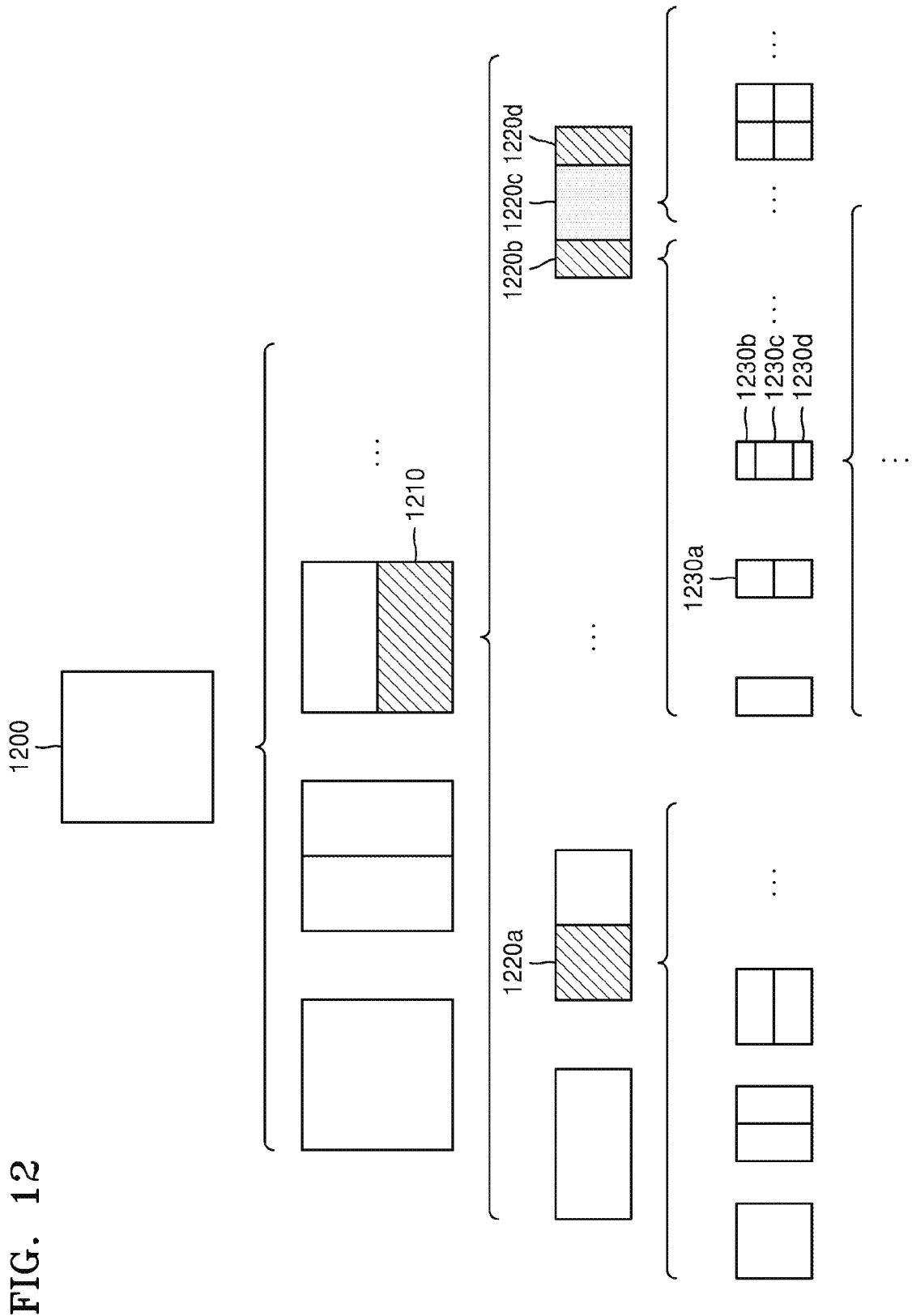
FIG. 12 illustrates a process of splitting a coding unit based on at least one of block shape information and split shape information, according to an embodiment.

FIG. 12 illustrates a process, performed by the image decoding apparatus 200, of splitting a coding unit based on at least one of block shape information and split shape information, according to an embodiment.

According to an embodiment, the image decoding apparatus 200 may determine to split or not to split a square first coding unit 1200 into coding units, based on at least one of the block shape information and the split shape information. According to an embodiment, when the split shape information indicates to split the first coding unit 1200 in a horizontal direction, the image decoding apparatus 200 may determine a second coding unit 1210 by splitting the first coding unit 1200 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 200 may determine to split or not to split the determined second coding unit 1210 into coding units, based on at least one of the block shape information and the split shape information. Referring to FIG. 12, the image decoding apparatus 200 may or may not split the non-square second coding unit 1210, which is determined by splitting the first coding unit 1200, into one or more third coding units 1220a, or 1220b, 1220c, and 1220d based on at least one of the block shape information and the split shape information. The image decoding apparatus 200 may obtain at least one of the block shape information and the split shape information, and determine a plurality of various-shaped second coding units (e.g., 1210) by splitting the first coding unit 1200, based on the obtained at least one of the block shape information and the split shape information, and the second coding unit 1210 may be split by using the splitting method of the first coding unit 1200, based on at least one of the block shape information and the split shape information. According to an embodiment, when the first coding unit 1200 is split into the second coding units 1210 based on at least one of the block shape information and the split shape information of the first coding unit 1200, the second coding unit 1210 may also be split into the third coding units 1220a, or 1220b, 1220c, and 1220d based on at least one of the block shape information and the split shape information of the second coding unit 1210. That is, a coding unit may be recursively split based on at least one of the block shape information and the split shape information of each coding unit. A method that may be used to recursively split a coding unit will be described below in relation to various embodiments.

According to an embodiment, the image decoding apparatus 200 may determine to split each of the third coding units 1220a, or 1220b, 1220c, and 1220d into coding units or not to split the second coding unit 1210, based on at least one of the block shape information and the split shape information. According to an embodiment, the image decoding apparatus 200 may split the non-square second coding unit 1210 into the odd number of third coding units 1220b, 1220c, and 1220d. The image decoding apparatus 200 may put a predetermined restriction on a predetermined third coding unit from among the odd number of third coding units 1220b, 1220c, and 1220d. For example, the image decoding apparatus 200 may restrict the third coding unit 1220c at a center location from among the odd number of third coding units 1220b, 1220c, and 1220d to be no longer split or to be split a settable number of times. Referring to FIG. 12, the image decoding apparatus 200 may restrict the third coding unit 1220c, which is at the center location from among the odd number of third coding units 1220b, 1220c, and 1220d included in the non-square second coding unit 1210, to be no longer split, to be split by using a predetermined splitting method (e.g., split into only four coding units or split by using a splitting method of the second coding unit 1210), or to be split only a predetermined number of times (e.g., split only n times (where n>0)). However, the restrictions on the third coding unit 1220c at the center location are not limited to the above-described examples, and may include various restrictions for decoding the third coding unit 1220c at the center location differently from the other third coding units 1220b and 1220d.

According to an embodiment, the image decoding apparatus 200 may obtain at least one of the block shape information and the split shape information, which is used to split a current coding unit, from a predetermined location in the current coding unit.

Figure 13:
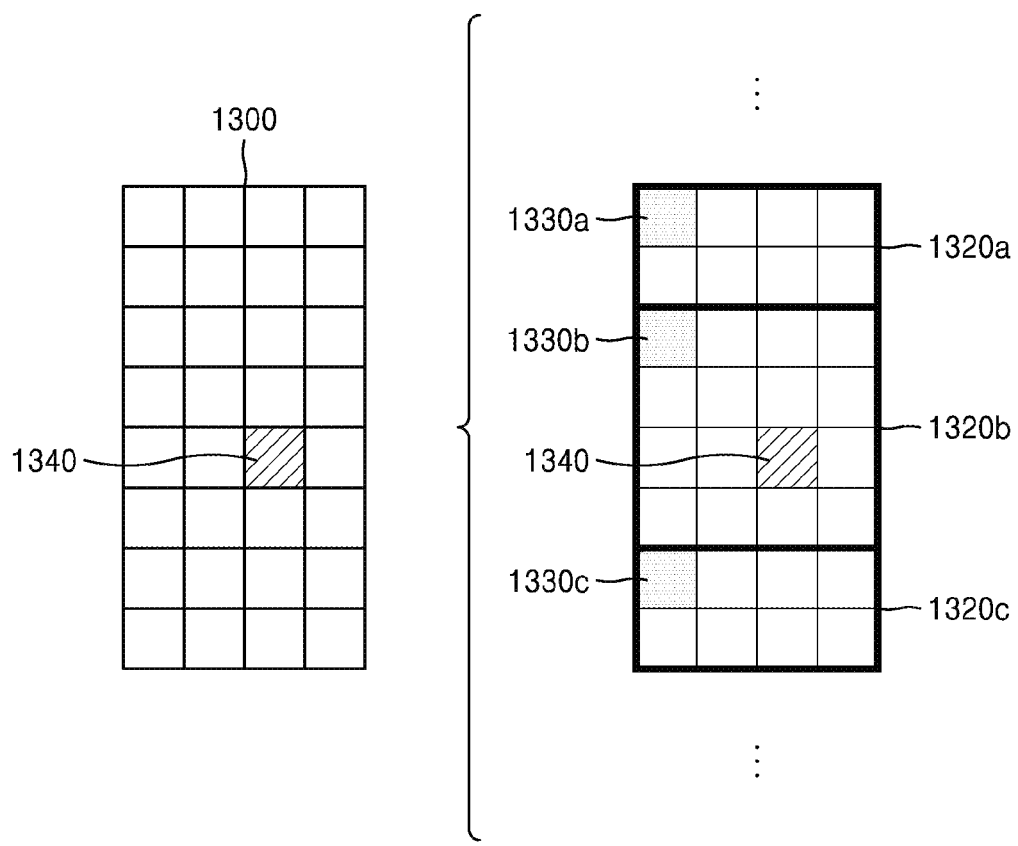
FIG. 13 illustrates a method of determining a predetermined coding unit from among an odd number of coding units, according to an embodiment.

FIG. 13 illustrates a method, performed by the image decoding apparatus 200, of determining a predetermined coding unit from among an odd number of coding units, according to an embodiment. Referring to FIG. 13, at least one of block shape information and split shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The image decoding apparatus 200 may obtain at least one of the block shape information and the split shape information from the predetermined location and determine to split or not to split the current coding unit into various-shaped and various-sized coding units.

According to an embodiment, when the current coding unit is split into a predetermined number of coding units, the image decoding apparatus 200 may select one of the coding units. Various methods may be used to select one of a plurality of coding units, as will be described below in relation to various embodiments.

According to an embodiment, the image decoding apparatus 200 may split the current coding unit into a plurality of coding units, and may determine a coding unit at a predetermined location.

FIG. 13 illustrates a method, performed by the image decoding apparatus 200, of determining a coding unit of a predetermined location from among an odd number of coding units, according to an embodiment.

According to an embodiment, the image decoding apparatus 200 may use information indicating locations of the odd number of coding units, to determine a coding unit at a center location from among the odd number of coding units. Referring to FIG. 13, the image decoding apparatus 200 may determine an odd number of coding units 1320a, 1320b, and 1320c by splitting the current coding unit 1300. The image decoding apparatus 200 may determine a coding unit 1320b at a center location by using information about locations of the odd number of coding units 1320a to 1320c. For example, the image decoding apparatus 200 may determine the coding unit 1320b of the center location by determining the locations of the coding units 1320a, 1320b, and 1320c based on information indicating locations of predetermined samples included in the coding units 1320a, 1320b, and 1320c. In detail, the image decoding apparatus 200 may determine the coding unit 1320b at the center location by determining the locations of the coding units 1320a, 1320b, and 1320c based on information indicating locations of top left samples 1330a, 1330b, and 1330c of the coding units 1320a, 1320b, and 1320c.

According to an embodiment, the information indicating the locations of the top left samples 1330a, 1330b, and 1330c, which are included in the coding units 1320a, 1320b, and 1320c, respectively, may include information about locations or coordinates of the coding units 1320a, 1320b, and 1320c in a picture. According to an embodiment, the information indicating the locations of the top left samples 1330a, 1330b, and 1330c, which are included in the coding units 1320a, 1320b, and 1320c, respectively, may include information indicating widths or heights of the coding units 1320a, 1320b, and 1320c included in the current coding unit 1300, and the widths or heights may correspond to information indicating differences between the coordinates of the coding units 1320a, 1320b, and 1320c in the picture. That is, the image decoding apparatus 200 may determine the coding unit 1320b at the center location by directly using the information about the locations or coordinates of the coding units 1320a, 1320b, and 1320c in the picture, or by using the information about the widths or heights of the coding units, which correspond to the difference values between the coordinates.

According to an embodiment, information indicating the location of the top left sample 1330a of the upper coding unit 1320a may include coordinates (xa, ya), information indicating the location of the top left sample 1330b of the middle coding unit 1320b may include coordinates (xb, yb), and information indicating the location of the top left sample 1330c of the lower coding unit 1320c may include coordinates (xc, yc). The image decoding apparatus 200 may determine the middle coding unit 1320b by using the coordinates of the top left samples 1330a, 1330b, and 1330c which are included in the coding units 1320a, 1320b, and 1320c, respectively. For example, when the coordinates of the top left samples 1330a, 1330b, and 1330c are sorted in an ascending or descending order, the coding unit 1320b including the coordinates (xb, yb) of the sample 1330b at a center location may be determined as a coding unit at a center location from among the coding units 1320a, 1320b, and 1320*c* determined by splitting the current coding unit 1300. However, the coordinates indicating the locations of the top left samples 1330*a*, 1330*b*, and 1330*c* may include coordinates indicating absolute locations in the picture, or may use coordinates (dxb, dyb) indicating a relative location of the top left sample 1330*b* of the middle coding unit 1320*b* and coordinates (dxc, dyc) indicating a relative location of the top left sample 1330*c* of the lower coding unit 1320*c* with reference to the location of the top left sample 1330*a* of the upper coding unit 1320*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 200 may split the current coding unit 1300 into a plurality of coding units 1320*a*, 1320*b*, and 1320*c*, and may select one of the coding units 1320*a*, 1320*b*, and 1320*c* based on a predetermined criterion. For example, the image decoding apparatus 200 may select the coding unit 1320*b*, which has a size different from that of the others, from among the coding units 1320*a*, 1320*b*, and 1320*c*.

According to an embodiment, the image decoding apparatus 200 may determine the widths or heights of the coding units 1320*a*, 1320*b*, and 1320*c* by using the coordinates (xa, ya) indicating the location of the top left sample 1330*a* of the upper coding unit 1320*a*, the coordinates (xb, yb) indicating the location of the top left sample 1330*b* of the middle coding unit 1320*b*, and the coordinates (xc, yc) indicating the location of the top left sample 1330*c* of the lower coding unit 1320*c*. The image decoding apparatus 200 may determine the respective sizes of the coding units 1320*a*, 1320*b*, and 1320*c* by using the coordinates (xa, ya), (xb, yb), and (xc, yc) indicating the locations of the coding units 1320*a*, 1320*b*, and 1320*c*.

According to an embodiment, the image decoding apparatus 200 may determine the width of the upper coding unit 1320*a* to be xb−xa and determine the height thereof to be yb−ya. According to an embodiment, the image decoding apparatus 200 may determine the width of the middle coding unit 1320*b* to be xc−xb and determine the height thereof to be yc−yb. According to an embodiment, the image decoding apparatus 200 may determine the width or height of the lower coding unit 1320*c* by using the width or height of the current coding unit 1300 or the widths or heights of the upper and middle coding units 1320*a* and 1320*b*. The image decoding apparatus 200 may determine a coding unit, which has a size different from that of the others, based on the determined widths and heights of the coding units 1320*a* to 1320*c*. Referring to FIG. 13, the image decoding apparatus 200 may determine the middle coding unit 1320*b*, which has a size different from the size of the upper and lower coding units 1320*a* and 1320*c*, as the coding unit of the predetermined location. However, the above-described method, performed by the image decoding apparatus 200, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 200 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 200 may determine the coding unit at the predetermined location in a horizontal direction. That is, the image decoding apparatus 200 may determine one of coding units at different locations in a horizontal direction and put a restriction on the coding unit. When the current coding unit has a non-square shape, a height of which is longer than a width, the image decoding apparatus 200 may determine the coding unit at the predetermined location in a vertical direction. That is, the image decoding apparatus 200 may determine one of coding units at different locations in a vertical direction and may put a restriction on the coding unit.

According to an embodiment, the image decoding apparatus 200 may use information indicating respective locations of an even number of coding units, to determine the coding unit at the predetermined location from among the even number of coding units. The image decoding apparatus 200 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 200 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the image decoding apparatus 200 may split the current coding unit 1300 into a plurality of coding units 1320*a*, 1320*b*, and 1320*c* based on at least one of the block shape information and the split shape information, and may determine a coding unit 1320*b* at a center location from among the plurality of the coding units 1320*a*, 1320*b*, and 1320*c*. Furthermore, the image decoding apparatus 200 may determine the coding unit 1320*b* at the center location, in consideration of a location from which at least one of the block shape information and the split shape information is obtained. That is, at least one of the block shape information and the split shape information of the current coding unit 1300 may be obtained from the sample 1340 at a center location of the current coding unit 1300 and, when the current coding unit 1300 is split into the plurality of coding units 1320*a*, 1320*b*, and 1320*c* based on at least one of the block shape information and the split shape information, the coding unit 1320*b* including the sample 1340 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the image decoding apparatus 200 may use at least one of the block shape information and the split shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by splitting the current coding unit 1300 (e.g., a coding unit at a center location from among a plurality of split coding units). That is, the image decoding apparatus 200 may determine the sample at the predetermined location by considering a block shape of the current coding unit 1300, determine the coding unit 1320b including a sample, from which predetermined information (e.g., at least one of the block shape information and the split shape information) may be obtained, from among the plurality of coding units 1320a, 1320b, and 1320c determined by splitting the current coding unit 1300, and may put a predetermined restriction on the coding unit 1320b. Referring to FIG. 13, according to an embodiment, the image decoding apparatus 200 may determine the sample 1340 at the center location of the current coding unit 1300 as the sample from which the predetermined information may be obtained, and may put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the image decoding apparatus 200 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 200 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 200 may use at least one of the block shape information and the split shape information to determine a coding unit at a predetermined location from among the plurality of coding units. According to an embodiment, the image decoding apparatus 200 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 12, and thus detailed descriptions thereof will not be provided here.

According to an embodiment, the image decoding apparatus 200 may determine one or more coding units by splitting the current coding unit, and may determine an order of decoding the one or more coding units, based on a predetermined block (e.g., the current coding unit).

Figure 14:
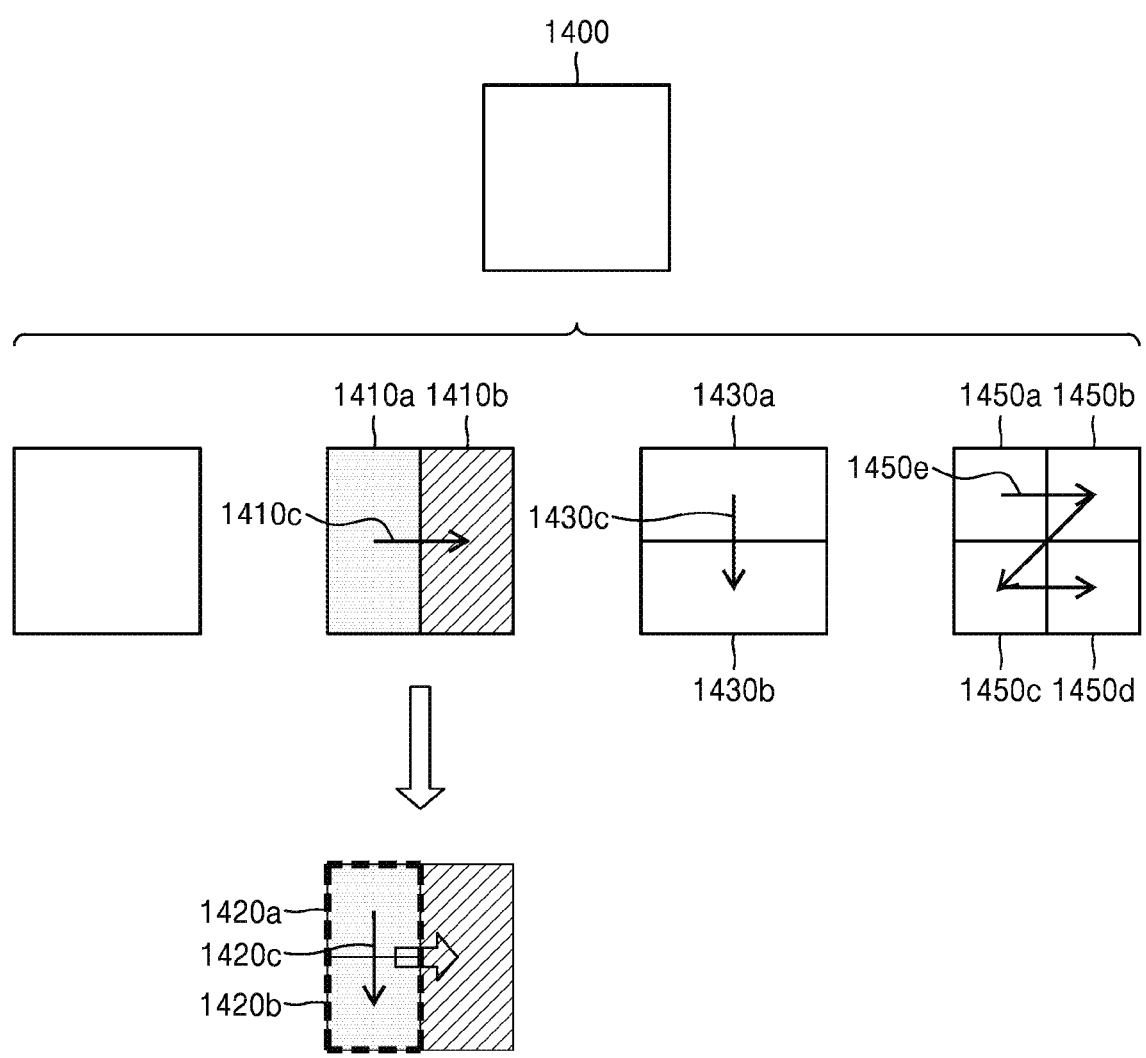
FIG. 14 illustrates an order of processing a plurality of coding units when the plurality of coding units are determined by splitting a current coding unit, according to an embodiment.

FIG. 14 illustrates an order of processing a plurality of coding units when the image decoding apparatus 200 determines the plurality of coding units by splitting a current coding unit, according to an embodiment.

According to an embodiment, the image decoding apparatus 200 may determine second coding units 1410a and 1410b by splitting a first coding unit 1400 in a vertical direction, determine second coding units 1430a and 1430b by splitting the first coding unit 1400 in a horizontal direction, or determine second coding units 1450a to 1450d by splitting the first coding unit 1400 in vertical and horizontal directions, based on block shape information and split shape information.

Referring to FIG. 14, the image decoding apparatus 200 may determine to process the second coding units 1410a and 1410b, which are determined by splitting the first coding unit 1400 in a vertical direction, in a horizontal direction order 1410c. The image decoding apparatus 200 may determine to process the second coding units 1430a and 1430b, which are determined by splitting the first coding unit 1400 in a horizontal direction, in a vertical direction order 1430c. The image decoding apparatus 200 may determine to process the second coding units 1450a to 1450d, which are determined by splitting the first coding unit 1400 in vertical and horizontal directions, in a predetermined order for processing coding units in a row and then processing coding units in a next row (e.g., in a raster scan order or Z-scan order 1450e).

According to an embodiment, the image decoding apparatus 200 may recursively split coding units. Referring to FIG. 14, the image decoding apparatus 200 may determine a plurality of coding units 1410a, 1410b, 1430a, 1430b, 1450a, 1450b, 1450c, and 1450d by splitting the first coding unit 1400, and may recursively split each of the determined plurality of coding units 1410a, 1410b, 1430a, 1430b, 1450a, 1450b, 1450c, and 1450d. A splitting method of the plurality of coding units 1410a, 1410b, 1430a, 1430b, 1450a, 1450b, 1450c, and 1450d may correspond to a splitting method of the first coding unit 1400. As such, each of the plurality of coding units 1410a, 1410b, 1430a, 1430b, 1450a, 1450b, 1450c, and 1450d may be independently split into a plurality of coding units. Referring to FIG. 14, the image decoding apparatus 200 may determine the second coding units 1410a and 1410b by splitting the first coding unit 1400 in a vertical direction, and may determine to independently split or not to split each of the second coding units 1410a and 1410b.

According to an embodiment, the image decoding apparatus 200 may determine third coding units 1420a and 1420b by splitting the left second coding unit 1410a in a horizontal direction, and may not split the right second coding unit 1410b.

According to an embodiment, a processing order of coding units may be determined based on an operation of splitting a coding unit. In other words, a processing order of split coding units may be determined based on a processing order of coding units immediately before being split. The image decoding apparatus 200 may determine a processing order of the third coding units 1420a and 1420b determined by splitting the left second coding unit 1410a, independently of the right second coding unit 1410b. Because the third coding units 1420a and 1420b are determined by splitting the left second coding unit 1410a in a horizontal direction, the third coding units 1420a and 1420b may be processed in a vertical direction order 1420c. Because the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being split is not limited to the above-described example, and various methods may be used to independently process coding units, which are split and determined to various shapes, in a predetermined order.

Figure 15:
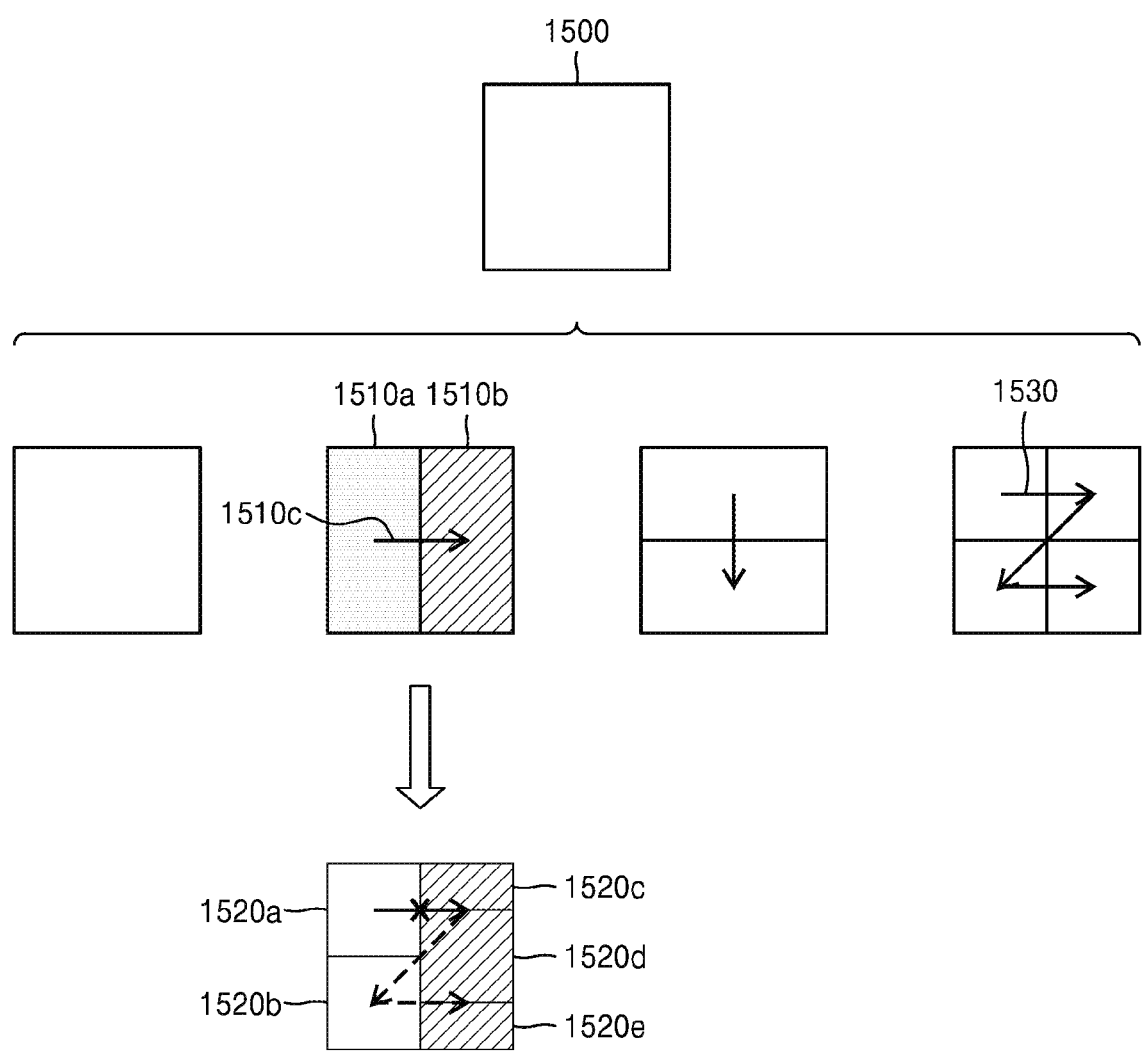
FIG. 15 illustrates a process of determining that a current coding unit is to be split into an odd number of coding units, when the coding units are not processable in a predetermined order, according to an embodiment.

FIG. 15 illustrates a process, performed by the image decoding apparatus 200, of determining that a current coding unit is to be split into an odd number of coding units, when the coding units are not processable in a predetermined order, according to an embodiment.

According to an embodiment, the image decoding apparatus 200 may determine whether the current coding unit is split into an odd number of coding units, based on obtained block shape information and split shape information. Referring to FIG. 15, a square first coding unit 1500 may be split into non-square second coding units 1510a and 1510b, and the second coding units 1510a and 1510b may be independently split into third coding units 1520a and 1520b, and 1520c to 1520e. According to an embodiment, the image decoding apparatus 200 may determine a plurality of third coding units 1520a and 1520b by splitting the left second coding unit 1510a in a horizontal direction, and may split the right second coding unit 1510b into an odd number of third coding units 1520c to 1520e.

According to an embodiment, the image decoding apparatus 200 may determine whether any coding unit is split into an odd number of coding units, by determining whether the third coding units 1520a and 1520b, and 1520c to 1520e are processable in a predetermined order. Referring to FIG. 15, the image decoding apparatus 200 may determine the third coding units 1520a and 1520b, and 1520c to 1520e by recursively splitting the first coding unit 1500. The image decoding apparatus 200 may determine whether any of the first coding unit 1500, the second coding units 1510a and 1510b, and the third coding units 1520a and 1520b, and 1520c, 1520d, and 1520e are split into an odd number of coding units, based on at least one of the block shape information and the split shape information. For example, the right second coding unit 1510b may be split into an odd number of third coding units 1520c, 1520d, and 1520e. A processing order of a plurality of coding units included in the first coding unit 1500 may be a predetermined order (e.g., a Z-scan order 1530), and the image decoding apparatus 200 may decide whether the third coding units 1520c, 1520d, and 1520e, which are determined by splitting the right second coding unit 1510b into an odd number of coding units, satisfy a condition for processing in the predetermined order.

According to an embodiment, the image decoding apparatus 200 may determine whether the third coding units 1520a and 1520b, and 1520c, 1520d, and 1520e included in the first coding unit 1500 satisfy the condition for processing in the predetermined order, and the condition relates to whether at least one of a width and height of the second coding units 1510a and 1510b is divided in half along a boundary of the third coding units 1520a and 1520b, and 1520c, 1520d, and 1520e. For example, the third coding units 1520a and 1520b determined by dividing the height of the non-square left second coding unit 1510a in half satisfy the condition. However, because boundaries of the third coding units 1520c, 1520d, and 1520e determined by splitting the right second coding unit 1510b into three coding units do not divide the width or height of the right second coding unit 1510b in half, it may be determined that the third coding units 1520c, 1520d, and 1520e do not satisfy the condition. When the condition is not satisfied as described above, the image decoding apparatus 200 may decide disconnection of a scan order, and determine that the right second coding unit 1510b is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

Figure 16:
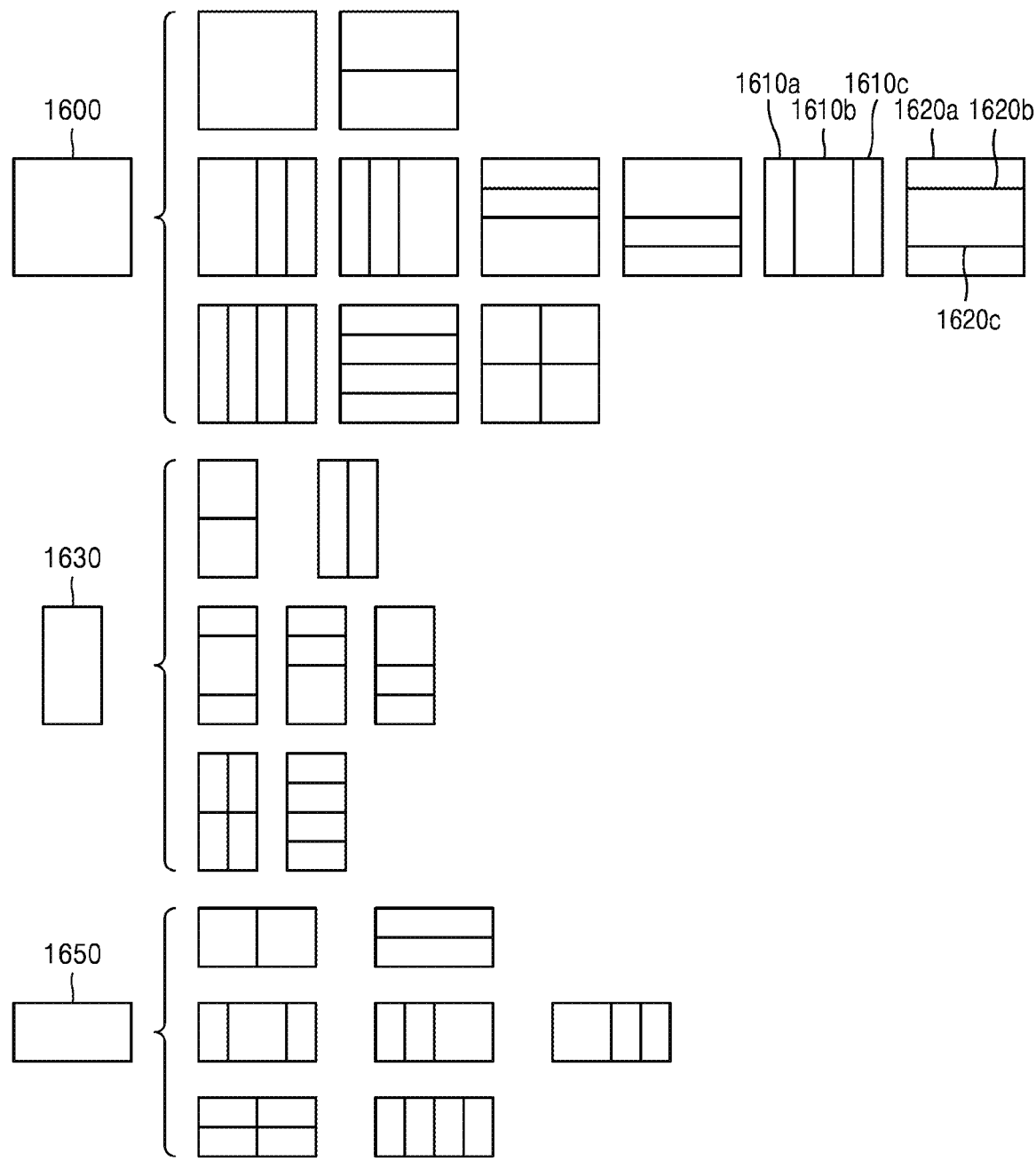
FIG. 16 illustrates a process of determining at least one coding unit by splitting a first coding unit, according to an embodiment.

FIG. 16 illustrates a process, performed by the image decoding apparatus 200, of determining at least one coding unit by splitting a first coding unit 1600, according to an embodiment. According to an embodiment, the image decoding apparatus 200 may split the first coding unit 1600, based on at least one of block shape information and split shape information, which is obtained by the receiver 210. The square first coding unit 1600 may be split into four square coding units, or may be split into a plurality of non-square coding units. For example, referring to FIG. 16, when the block shape information indicates that the first coding unit 1600 has a square shape and the split shape information indicates to split the first coding unit 1600 into non-square coding units, the image decoding apparatus 200 may split the first coding unit 1600 into a plurality of non-square coding units. In detail, when the split shape information indicates to determine an odd number of coding units by splitting the first coding unit 1600 in a horizontal direction or a vertical direction, the image decoding apparatus 200 may split the square first coding unit 1600 into an odd number of coding units, e.g., second coding units 1610a, 1610b, and 1610c determined by splitting the square first coding unit 1600 in a vertical direction or second coding units 1620a, 1620b, and 1620c determined by splitting the square first coding unit 1600 in a horizontal direction.

According to an embodiment, the image decoding apparatus 200 may determine whether the second coding units 1610a, 1610b, 1610c, 1620a, 1620b, and 1620c included in the first coding unit 1600 satisfy a condition for processing in a predetermined order, and the condition relates to whether at least one of a width and height of the first coding unit 1600 is divided in half along a boundary of the second coding units 1610a, 1610b, 1610c, 1620a, 1620b, and 1620c. Referring to FIG. 16, because boundaries of the second coding units 1610a, 1610b, and 1610c determined by splitting the square first coding unit 1600 in a vertical direction do not divide the width of the first coding unit 1600 in half, it may be determined that the first coding unit 1600 does not satisfy the condition for processing in the predetermined order. In addition, because boundaries of the second coding units 1620a, 1620b, and 1620c determined by splitting the square first coding unit 1600 in a horizontal direction do not divide the width of the first coding unit 1600 in half, it may be determined that the first coding unit 1600 does not satisfy the condition for processing in the predetermined order. When the condition is not satisfied as described above, the image decoding apparatus 200 may decide disconnection of a scan order, and may determine that the first coding unit 1600 is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 200 may determine various-shaped coding units by splitting a first coding unit.

Referring to FIG. 16, the image decoding apparatus 200 may split the square first coding unit 1600 or a non-square first coding unit 1630 or 1650 into various-shaped coding units.

Figure 17:
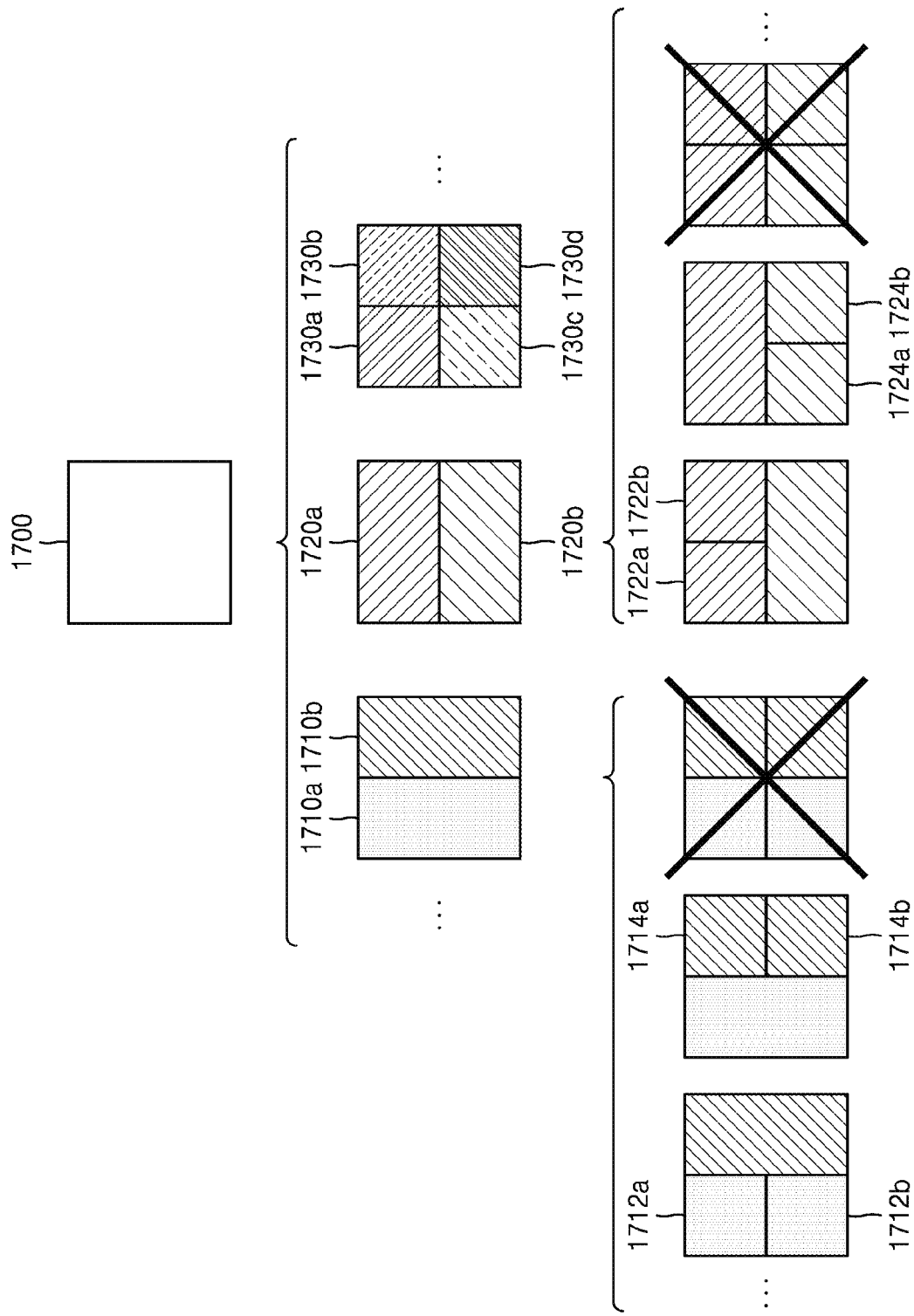
FIG. 17 illustrates that a shape into which a second coding unit is splittable is restricted when the second coding unit having a non-square shape, which is determined by splitting a first coding unit, satisfies a predetermined condition, according to an embodiment.

FIG. 17 illustrates that a shape into which a second coding unit is splittable by the image decoding apparatus 200 is restricted when the second coding unit having a non-square shape, which is determined by splitting a first coding unit 1700, satisfies a predetermined condition, according to an embodiment.

According to an embodiment, the image decoding apparatus 200 may determine to split the square first coding unit 1700 into non-square second coding units 1710a, 1710b, 1720a, and 1720b, based on at least one of block shape information and split shape information, which is obtained by the receiver 210. The second coding units 1710a, 1710b, 1720a, and 1720b may be independently split. As such, the image decoding apparatus 200 may determine to split or not to split the first coding unit 1700 into a plurality of coding units, based on at least one of the block shape information and the split shape information of each of the second coding units 1710a, 1710b, 1720a, and 1720b. According to an embodiment, the image decoding apparatus 200 may determine third coding units 1712a and 1712b by splitting the non-square left second coding unit 1710a, which is determined by splitting the first coding unit 1700 in a vertical direction, in a horizontal direction. However, when the left second coding unit 1710a is split in a horizontal direction, the image decoding apparatus 200 may restrict the right second coding unit 1710b to not be split in a horizontal direction in which the left second coding unit 1710a is split. When third coding units 1714a and 1714b are determined by splitting the right second coding unit 1710b in a same direction, because the left and right second coding units 1710a and 1710b are independently split in a horizontal direction, the third coding units 1712a, 1712b, 1714a, and 1714b may be determined. However, this case serves equally as a case in which the image decoding apparatus 200 splits the first coding unit 1700 into four square second coding units 1730a, 1730b, 1730c, and 1730d, based on at least one of the block shape information and the split shape information, and may be inefficient in terms of image decoding.

According to an embodiment, the image decoding apparatus 200 may determine third coding units 1722a, 1722b, 1724a, and 1724b by splitting the non-square second coding unit 1720a or 1720b, which is determined by splitting in a horizontal direction, in a vertical direction. However, when a second coding unit (e.g., the upper second coding unit 1720a) is split in a vertical direction, for the above-described reason, the image decoding apparatus 200 may restrict the other second coding unit (e.g., the lower second coding unit 1720b) to not be split in a vertical direction in which the upper second coding unit 1720a is split.

Figure 18:
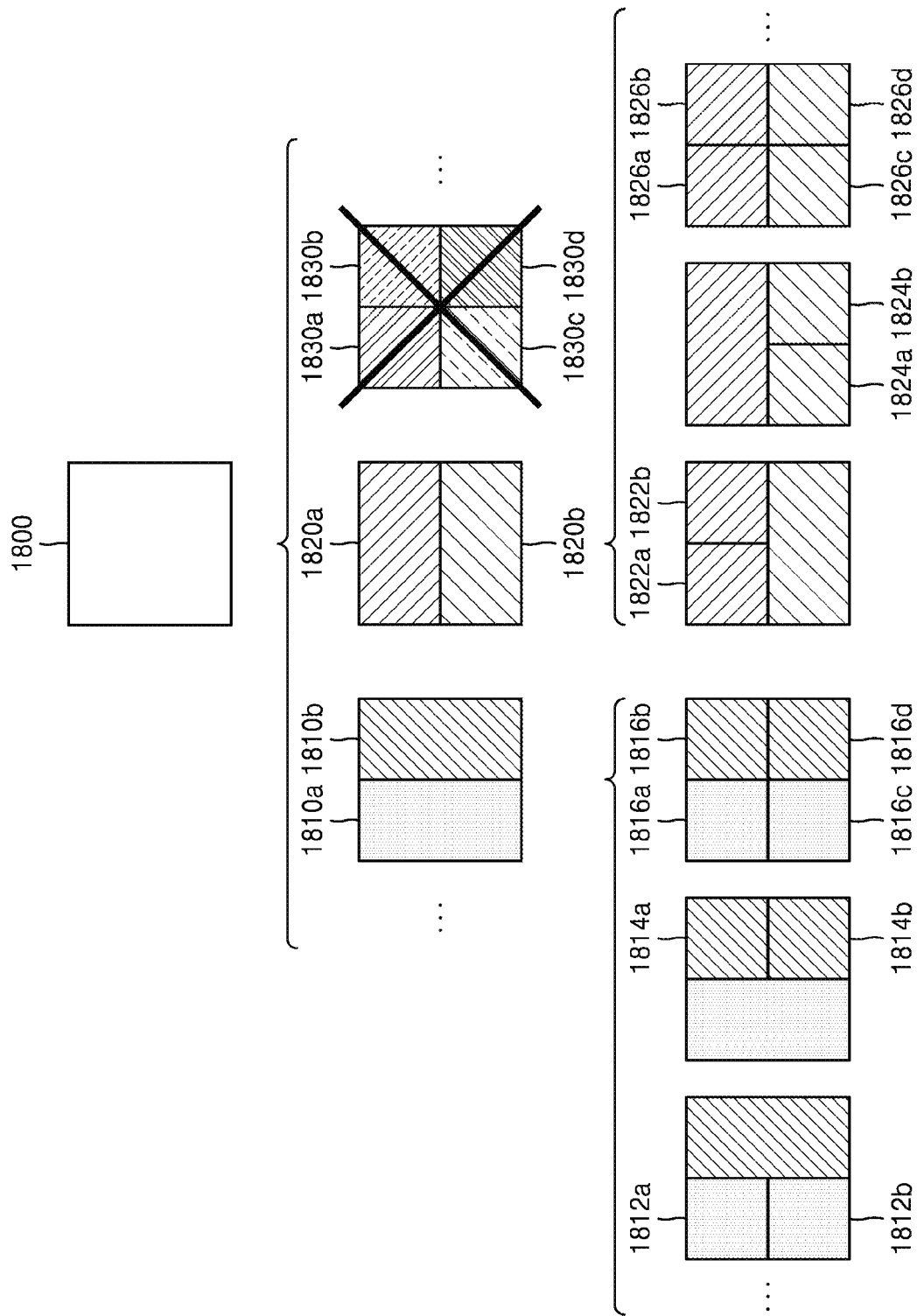
FIG. 18 illustrates a process of splitting a square coding unit when split shape information indicates that the square coding unit is not to be split into four square coding units, according to an embodiment.

FIG. 18 illustrates a process, performed by the image decoding apparatus 200, of splitting a square coding unit when split shape information indicates that the square coding unit is not to be split into four square coding units, according to an embodiment.

According to an embodiment, the image decoding apparatus 200 may determine second coding units 1810a, 1810b, 1820a, 1820b, etc. by splitting a first coding unit 1800, based on at least one of block shape information and split shape information. The split shape information may include information about various methods of splitting a coding unit but, the information about various splitting methods may not include information for splitting a coding unit into four square coding units. According to such split shape information, the image decoding apparatus 200 may not split the first square coding unit 1800 into four square second coding units 1830a, 1830b, 1830c, and 1830d. The image decoding apparatus 200 may determine the non-square second coding units 1810a, 1810b, 1820a, 1820b, etc., based on the split shape information.

According to an embodiment, the image decoding apparatus 200 may independently split the non-square second coding units 1810a, 1810b, 1820a, 1820b, etc. Each of the second coding units 1810a, 1810b, 1820a, 1820b, etc. may be recursively split in a predetermined order, and this splitting method may correspond to a method of splitting the first coding unit 1800, based on at least one of the block shape information and the split shape information.

For example, the image decoding apparatus 200 may determine square third coding units 1812a and 1812b by splitting the left second coding unit 1810a in a horizontal direction, and may determine square third coding units 1814a and 1814b by splitting the right second coding unit 1810b in a horizontal direction. Furthermore, the image decoding apparatus 200 may determine square third coding units 1816a, 1816b, 1816c, and 1816d by splitting both of the left and right second coding units 1810a and 1810b in a horizontal direction. In this case, coding units having the same shape as the four square second coding units 1830a, 1830b, 1830c, and 1830d split from the first coding unit 1800 may be determined.

As another example, the image decoding apparatus 200 may determine square third coding units 1822a and 1822b by splitting the upper second coding unit 1820a in a vertical direction, and may determine square third coding units 1824a and 1824b by splitting the lower second coding unit 1820b in a vertical direction. Furthermore, the image decoding apparatus 200 may determine square third coding units 1822a, 1822b, 1824a, and 1824b by splitting both of the upper and lower second coding units 1820a and 1820b in a vertical direction. In this case, coding units having the same shape as the four square second coding units 1830a, 1830b, 1830c, and 1830d split from the first coding unit 1800 may be determined.

Figure 19:
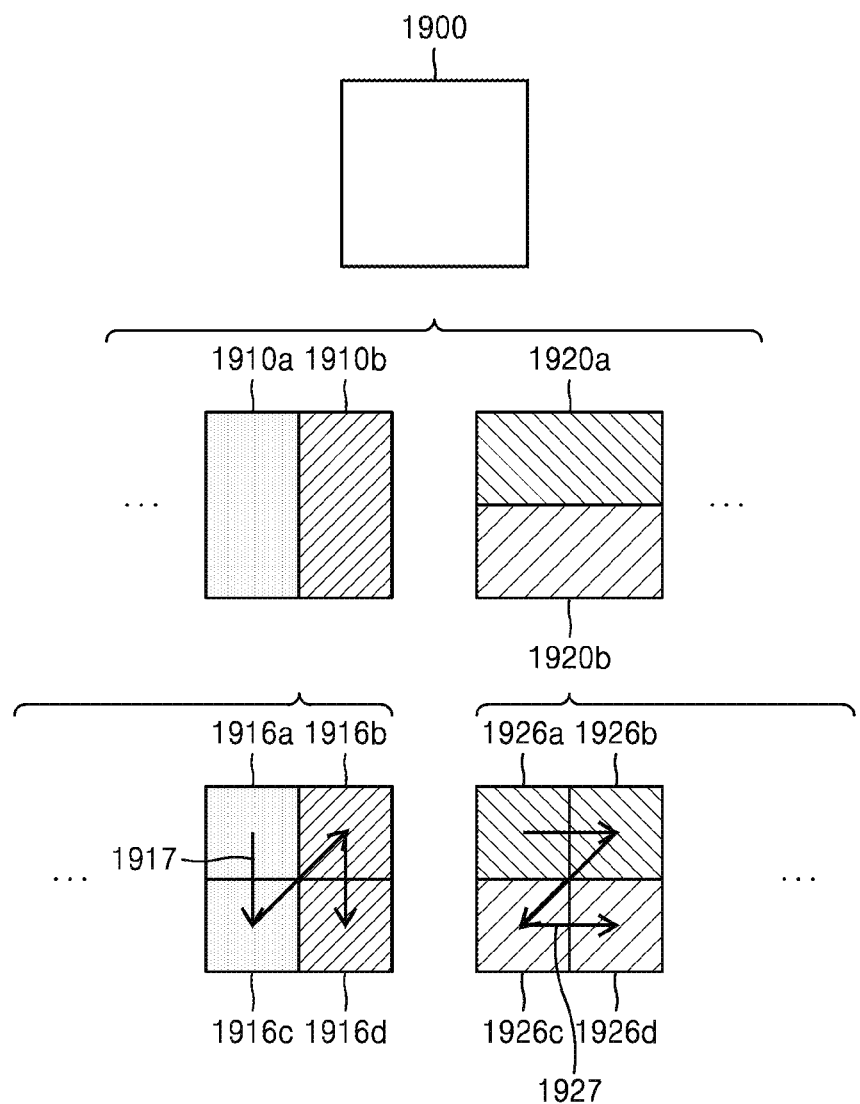
FIG. 19 illustrates that a processing order between a plurality of coding units may be changed depending on a process of splitting a coding unit, according to an embodiment.

FIG. 19 illustrates that a processing order between a plurality of coding units may be changed depending on a process of splitting a coding unit, according to an embodiment.

According to an embodiment, the image decoding apparatus 200 may split a first coding unit 1900, based on block shape information and split shape information. When the block shape information indicates a square shape and the split shape information indicates to split the first coding unit 1900 in at least one of horizontal and vertical directions, the image decoding apparatus 200 may determine second coding units 1910a, 1910b, 1920a, 1920b, 1930a, 1930b, 1930c, and 1930d by splitting the first coding unit 1900. Referring to FIG. 19, the non-square second coding units 1910a, 1910b, 1920a, and 1920b determined by splitting the first coding unit 1900 in only a horizontal direction or vertical direction may be independently split based on the block shape information and the split shape information of each coding unit. For example, the image decoding apparatus 200 may determine third coding units 1916a, 1916b, 1916c, and 1916d by splitting the second coding units 1910a and 1910b, which are generated by splitting the first coding unit 1900 in a vertical direction, in a horizontal direction, and may determine third coding units 1926a, 1926b, 1926c, and 1926d by splitting the second coding units 1920a and 1920b, which are generated by splitting the first coding unit 1900 in a horizontal direction, in a horizontal direction. An operation of splitting the second coding units 1910a, 1910b, 1920a, and 1920b has been described above in relation to FIG. 17, and thus detailed descriptions thereof will not be provided herein.

According to an embodiment, the image decoding apparatus 200 may process coding units in a predetermined order. An operation of processing coding units in a predetermined order has been described above in relation to FIG. 14, and thus detailed descriptions thereof will not be provided herein. Referring to FIG. 19, the image decoding apparatus 200 may determine four square third coding units 1916a, 1916b, 1916c, and 1916d, and 1926a, 1926b, 1926c, and 1926d by splitting the square first coding unit 1900. According to an embodiment, the image decoding apparatus 200 may determine processing orders of the third coding units 1916a, 1916b, 1916c, and 1916d, and 1926a, 1926b, 1926c, and 1926d based on a splitting method of the first coding unit 1900.

According to an embodiment, the image decoding apparatus 200 may determine the third coding units 1916a, 1916b, 1916c, and 1916d by splitting the second coding units 1910a and 1910b generated by splitting the first coding unit 1900 in a vertical direction, in a horizontal direction, and may process the third coding units 1916a, 1916b, 1916c, and 1916d in a processing order 1917 for initially processing the third coding units 1916a and 1916b, which are included in the left second coding unit 1910a, in a vertical direction and then processing the third coding unit 1916c and 1916d, which are included in the right second coding unit 1910b, in a vertical direction.

According to an embodiment, the image decoding apparatus 200 may determine the third coding units 1926a, 1926b, 1926c, and 1926d by splitting the second coding units 1920a and 1920b generated by splitting the first coding unit 1900 in a horizontal direction, in a vertical direction, and may process the third coding units 1926a, 1926b, 1926c, and 1926d in a processing order 1927 for initially processing the third coding units 1926a and 1926b, which are included in the upper second coding unit 1920a, in a horizontal direction and then processing the third coding unit 1926c and 1926d, which are included in the lower second coding unit 1920b, in a horizontal direction.

Referring to FIG. 19, the square third coding units 1916a, 1916b, 1916c, and 1916d, and 1926a, 1926b, 1926c, and 1926d may be determined by splitting the second coding units 1910a, 1910b, 1920a, and 1920b, respectively. Although the second coding units 1910a and 1910b are determined by splitting the first coding unit 1900 in a vertical direction differently from the second coding units 1920a and 1920b which are determined by splitting the first coding unit 1900 in a horizontal direction, the third coding units 1916a, 1916b, 1916c, and 1916d, and 1926a, 1926b, 1926c, and 1926d split therefrom eventually show same-shaped coding units split from the first coding unit 1900. As such, by recursively splitting a coding unit in different manners based on at least one of the block shape information and the split shape information, the image decoding apparatus 200 may process a plurality of coding units in different orders even when the coding units are eventually determined to be the same shape.

FIG. 20 illustrates a process of determining a depth of a coding unit as a shape and size of the coding unit change, when the coding unit is recursively split such that a plurality of coding units are determined, according to an embodiment.

According to an embodiment, the image decoding apparatus 200 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 200 may determine that a depth of the current coding unit is increased from a depth of the coding unit before being split, by n. In the following description, a coding unit having an increased depth is expressed as a coding unit of a deeper depth.

Referring to FIG. 20, according to an embodiment, the image decoding apparatus 200 may determine a second coding unit 2002 and a third coding unit 2004 of deeper depths by splitting a square first coding unit 2000 based on block shape information indicating a square shape (for example, the block shape information may be expressed as '0: SQUARE'). Assuming that the size of the square first coding unit 2000 is 2N×2N, the second coding unit 2002 determined by dividing a width and height of the first coding unit 2000 to $\frac{1}{2}^1$ may have a size of N×N. Furthermore, the third coding unit 2004 determined by dividing a width and height of the second coding unit 2002 to ½ may have a size of N/2×N/2. In this case, a width and height of the third coding unit 2004 are $\frac{1}{2}^2$ times those of the first coding unit 2000. When a depth of the first coding unit 2000 is D, a depth of the second coding unit 2002, the width and height of which are $\frac{1}{2}^1$ times those of the first coding unit 2000, may be D+1, and a depth of the third coding unit 2004, the width and height of which are $\frac{1}{2}^2$ times those of the first coding unit 2000, may be D+2.

According to an embodiment, the image decoding apparatus 200 may determine a second coding unit 2012 or 2022 and a third coding unit 2014 or 2024 of deeper depths by splitting a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 200 may determine a second coding unit 2002, 2012, or 2022 by dividing at least one of a width and height of the first coding unit 2010 having a size of N×2N. That is, the image decoding apparatus 200 may determine the second coding unit 2002 having a size of N×N or the second coding unit 2022 having a size of N×N/2 by splitting the first coding unit 2010 in a horizontal direction, or may determine the second coding unit 2012 having a size of N/2×N by splitting the first coding unit 2010 in horizontal and vertical directions.

According to an embodiment, the image decoding apparatus 200 may determine the second coding unit 2002, 2012, or 2022 by dividing at least one of a width and height of the first coding unit 2020 having a size of 2N×N. That is, the image decoding apparatus 200 may determine the second coding unit 2002 having a size of N×N or the second coding unit 2012 having a size of N/2×N by splitting the first coding unit 2020 in a vertical direction, or may determine the second coding unit 2022 having a size of N×N/2 by splitting the first coding unit 2020 in horizontal and vertical directions.

According to an embodiment, the image decoding apparatus 200 may determine a third coding unit 2004, 2014, or 2024 by dividing at least one of a width and height of the second coding unit 2002 having a size of N×N. That is, the image decoding apparatus 200 may determine the third coding unit 2004 having a size of N/2×N/2, the third coding unit 2014 having a size of N/2$^2$×N/2, or the third coding unit 2024 having a size of N/2×N/2$^2$ by splitting the second coding unit 2002 in vertical and horizontal directions.

According to an embodiment, the image decoding apparatus 200 may determine the third coding unit 2004, 2014, or 2024 by dividing at least one of a width and height of the second coding unit 2012 having a size of N/2×N. That is, the image decoding apparatus 200 may determine the third coding unit 2004 having a size of N/2×N/2 or the third coding unit 2024 having a size of N/2×N/2$^2$ by splitting the second coding unit 2012 in a horizontal direction, or may determine the third coding unit 2014 having a size of N/2$^2$×N/2 by splitting the second coding unit 2012 in vertical and horizontal directions.

According to an embodiment, the image decoding apparatus 200 may determine the third coding unit 2004, 2014, or 2024 by dividing at least one of a width and height of the second coding unit 2014 having a size of N×N/2. That is, the image decoding apparatus 200 may determine the third coding unit 2004 having a size of N/2×N/2 or the third coding unit 2014 having a size of N/2$^2$×N/2 by splitting the second coding unit 2012 in a vertical direction, or may determine the third coding unit 2024 having a size of N/2×N/2$^2$ by splitting the second coding unit 2022 in vertical and horizontal directions.

According to an embodiment, the image decoding apparatus 200 may split the square coding unit 2000, 2002, or 2004 in a horizontal or vertical direction. For example, the image decoding apparatus 200 may determine the first coding unit 2010 having a size of N×2N by splitting the first coding unit 2000 having a size of 2N×2N in a vertical direction, or may determine the first coding unit 2020 having a size of 2N×N by splitting the first coding unit 2000 in a horizontal direction. According to an embodiment, when a depth is determined based on the length of the longest side of a coding unit, a depth of a coding unit determined by splitting the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be ½$^2$ times those of the first coding unit 2010 or 2020. When a depth of the first coding unit 2010 or 2020 is D, a depth of the second coding unit 2012 or 2014, the width and height of which are ½ times those of the first coding unit 2010 or 2020, may be D+1, and a depth of the third coding unit 2014 or 2024, the width and height of which are ½$^2$ times those of the first coding unit 2010 or 2020, may be D+2.

Figure 21:
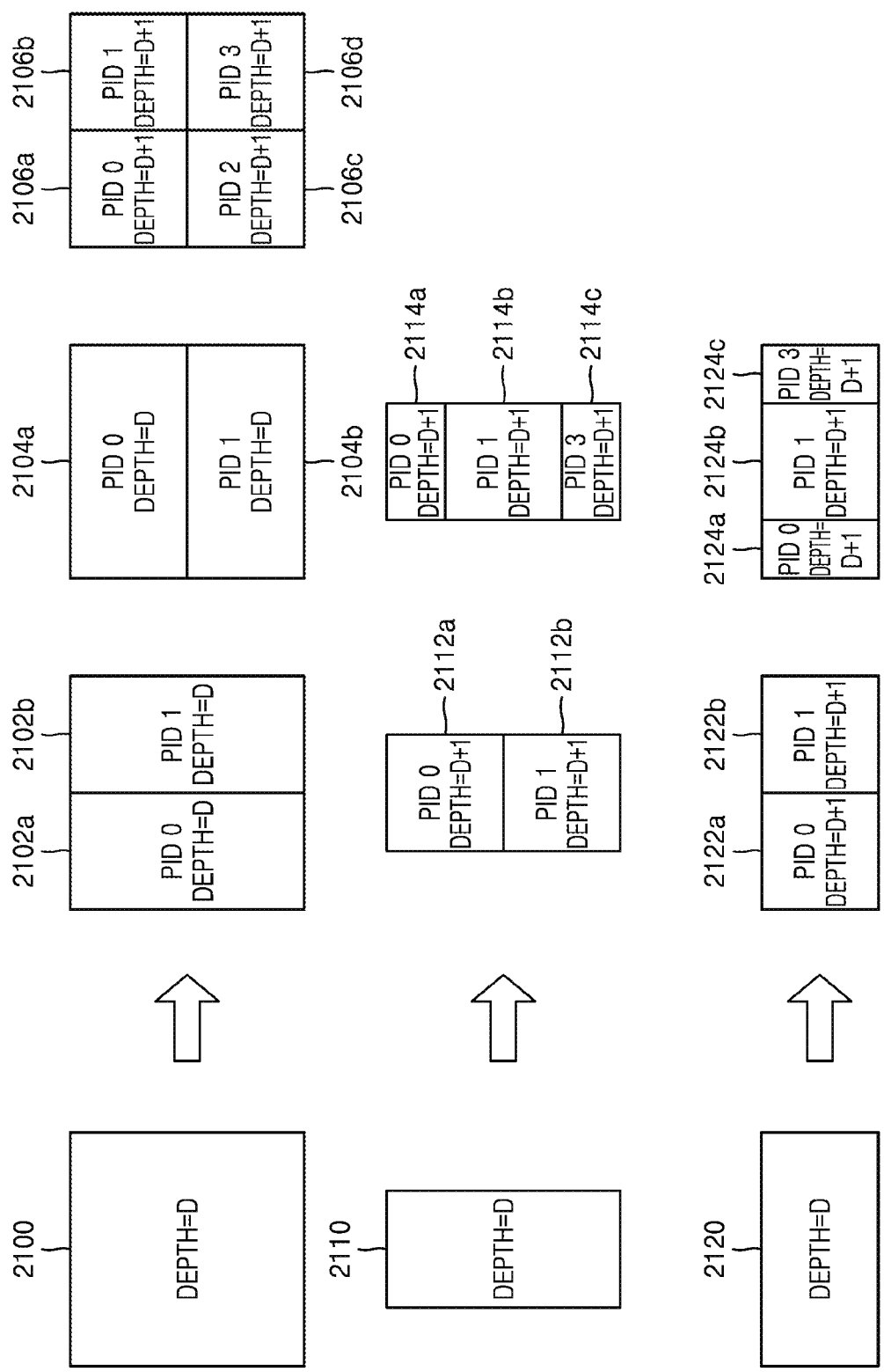
FIG. 21 illustrates depths that are determinable based on shapes and sizes of coding units, and part indexes (PIDs) that are for distinguishing the coding units, according to an embodiment.

FIG. 21 illustrates depths that are determinable based on shapes and sizes of coding units, and part indexes (PIDs) that are for distinguishing the coding units, according to an embodiment.

According to an embodiment, the image decoding apparatus 200 may determine various-shape second coding units by splitting a square first coding unit 2100. Referring to FIG. 21, the image decoding apparatus 200 may determine second coding units 2102a and 2102b, 2104a and 2104b, and 2106a, 2106b, 2106c, and 2106d by splitting the first coding unit 2100 in at least one of vertical and horizontal directions based on split shape information. That is, the image decoding apparatus 200 may determine the second coding units 2102a and 2102b, 2104a and 2104b, and 2106a, 2106b, 2106c, and 2106d, based on the split shape information of the first coding unit 2100.

According to an embodiment, a depth of the second coding units 2102a and 2102b, 2104a and 2104b, and 2106a, 2106b, 2106c, and 2106d, which are determined based on the split shape information of the square first coding unit 2100, may be determined based on the length of a long side thereof. For example, because the length of a side of the square first coding unit 2100 equals the length of a long side of the non-square second coding units 2102a and 2102b, and 2104a and 2104b, the first coding unit 2100 and the non-square second coding units 2102a and 2102b, and 2104a and 2104b may have the same depth, e.g., D. However, when the image decoding apparatus 200 splits the first coding unit 2100 into the four square second coding units 2106a, 2106b, 2106c, and 2106d based on the split shape information, because the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the image decoding apparatus 200 may determine a plurality of second coding units 2112a and 2112b, and 2114a, 2114b, and 2114c by splitting a first coding unit 2110, a height of which is longer than a width, in a horizontal direction based on the split shape information. According to an embodiment, the image decoding apparatus 200 may determine a plurality of second coding units 2122a and 2122b, and 2124a, 2124b, and 2124c by splitting a first coding unit 2120, a width of which is longer than a height, in a vertical direction based on the split shape information.

According to an embodiment, a depth of the second coding units 2112a and 2112b, 2114a, 2114b, and 2116a, 2116b, 2116c, and 2116d, which are determined based on the split shape information of the non-square first coding unit 2110 or 2120, may be determined based on the length of a long side thereof. For example, because the length of a side of the square second coding units 2112a and 2112b is ½ times the length of a long side of the first coding unit 2110 having a non-square shape, a height of which is longer than a width, a depth of the square second coding units 2102a, 2102b, 2104a, and 2104b is D+1 which is deeper than the depth D of the non-square first coding unit 2110 by 1.

Furthermore, the image decoding apparatus 200 may split the non-square first coding unit 2110 into an odd number of second coding units 2114a, 2114b, and 2114c based on the split shape information. The odd number of second coding units 2114a, 2114b, and 2114c may include the non-square second coding units 2114a and 2114c and the square second coding unit 2114b. In this case, because the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The image decoding apparatus 200 may determine depths of coding units split from the first coding unit 2120 having a non-square shape, a width of which is longer than a height, by using the above-described method of determining depths of coding units split from the first coding unit 2110.

According to an embodiment, the image decoding apparatus 200 may determine PIDs for identifying split coding units, based on a size ratio between the coding units when an odd number of split coding units do not have equal sizes. Referring to FIG. 21, a coding unit 2114b of a center location among an odd number of split coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, when a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the image decoding apparatus 200 may determine whether an odd number of split coding units do not have equal sizes, based on whether discontinuity is present in PIDs for identifying the split coding units.

(Tri-Split is Determined by Using PID)

According to an embodiment, the image decoding apparatus 200 may determine whether to use a specific splitting method, based on PID values for identifying a plurality of coding units determined by splitting a current coding unit. Referring to FIG. 21, the image decoding apparatus 200 may determine an even number of coding units 2112a and 2112b or an odd number of coding units 2114a, 2114b, and 2114c by splitting the first coding unit 2110 having a rectangular shape, a height of which is longer than a width. The image decoding apparatus 200 may use PIDs to identify respective coding units. According to an embodiment, the PID may be obtained from a sample of a predetermined location of each coding unit (e.g., a top left sample).

According to an embodiment, the image decoding apparatus 200 may determine a coding unit at a predetermined location from among the split coding units, by using the PIDs for distinguishing the coding units. According to an embodiment, when the split shape information of the first coding unit 2110 having a rectangular shape, a height of which is longer than a width, indicates to split a coding unit into three coding units, the image decoding apparatus 200 may split the first coding unit 2110 into three coding units 2114a, 2114b, and 2114c. The image decoding apparatus 200 may assign a PID to each of the three coding units 2114a, 2114b, and 2114c. The image decoding apparatus 200 may compare PIDs of an odd number of split coding units to determine a coding unit at a center location from among the coding units. The image decoding apparatus 200 may determine the coding unit 2114b having a PID corresponding to a middle value among the PIDs of the coding units, as the coding unit at the center location from among the coding units determined by splitting the first coding unit 2110. According to an embodiment, the image decoding apparatus 200 may determine PIDs for distinguishing split coding units, based on a size ratio between the coding units when the split coding units do not have equal sizes. Referring to FIG. 21, the coding unit 2114b generated by splitting the first coding unit 2110 may have a width equal to that of the other coding units 2114a and 2114c and a height which is two times that of the other coding units 2114a and 2114c. In this case, when the PID of the coding unit 2114b at the center location is 1, the PID of the coding unit 2114c located next to the coding unit 2114b may be increased by 2 and thus may be 3. When the PID is not uniformly increased as described above, the image decoding apparatus 200 may determine that a coding unit is split into a plurality of coding units including a coding unit having a size different from that of the other coding units. According to an embodiment, when the split shape information indicates to split a coding unit into an odd number of coding units, the image decoding apparatus 200 may split a current coding unit in such a manner that a coding unit of a predetermined location among an odd number of coding units (e.g., a coding unit of a centre location) has a size different from that of the other coding units. In this case, the image decoding apparatus 200 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 200 may use a predetermined data unit where a coding unit starts to be recursively split.

Figure 22:
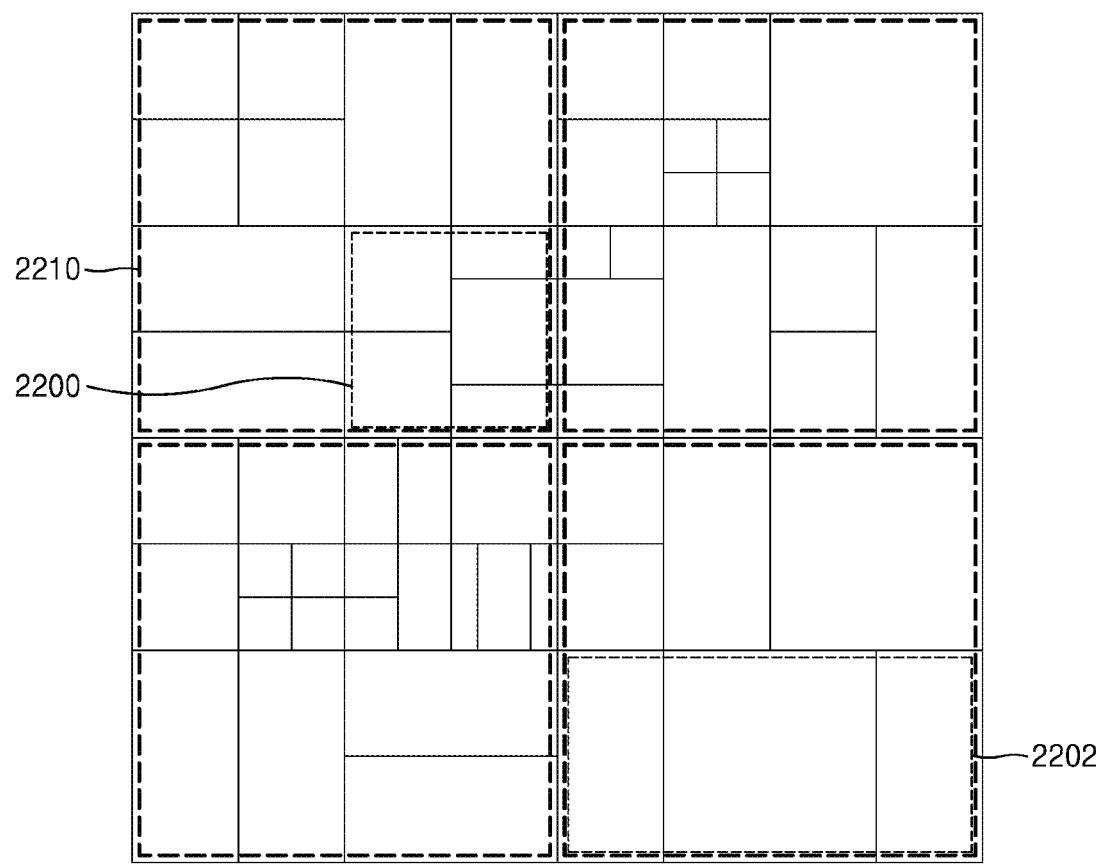
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as multipliers of 2. That is, the reference data unit may have a square or non-square shape, and may be split into an integer number of coding units.

According to an embodiment, the image decoding apparatus 200 may split the current picture into a plurality of reference data units. According to an embodiment, the image decoding apparatus 200 may split the plurality of reference data units, which are split from the current picture, by using splitting information about each reference data unit. The operation of splitting the reference data unit may correspond to a splitting operation using a quadtree structure.

According to an embodiment, the image decoding apparatus 200 may previously determine the minimum size allowed for the reference data units included in the current picture. Accordingly, the image decoding apparatus 200 may determine various reference data units having sizes equal to or greater than the minimum size, and may determine one or more coding units by using the block shape information and the split shape information with reference to the determined reference data unit.

Referring to FIG. 22, the image decoding apparatus 200 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, largest coding units, or the like).

According to an embodiment, the receiver 210 of the image decoding apparatus 200 may obtain, from a bitstream, at least one of reference coding unit shape information and reference coding unit size information with respect to each of the various data units. An operation of splitting the square reference coding unit 2200 into one or more coding units has been described above in relation to the operation of splitting the current coding unit 300 of FIG. 10, and an operation of splitting the non-square reference coding unit 2200 into one or more coding units has been described above in relation to the operation of splitting the current coding unit 1100 or 1150 of FIG. 11. Thus, detailed descriptions thereof will not be provided herein.

According to an embodiment, the image decoding apparatus 200 may use a PID for identifying the size and shape of reference coding units, to determine the size and shape of reference coding units according to some data units previously determined based on a predetermined condition. That is, the receiver 210 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 200 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 200 may determine at least one of the size and shape of reference coding units included in a data unit serving as a unit for obtaining the PID, by selecting the previously determined at least one of the size and shape of reference coding units based on the PID.

According to an embodiment, the image decoding apparatus 200 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 200 may determine the reference coding units by splitting the largest coding unit n times based on a quadtree structure, and may split the reference coding unit based on at least one of the block shape information and the split shape information according to various embodiments.

Figure 23:
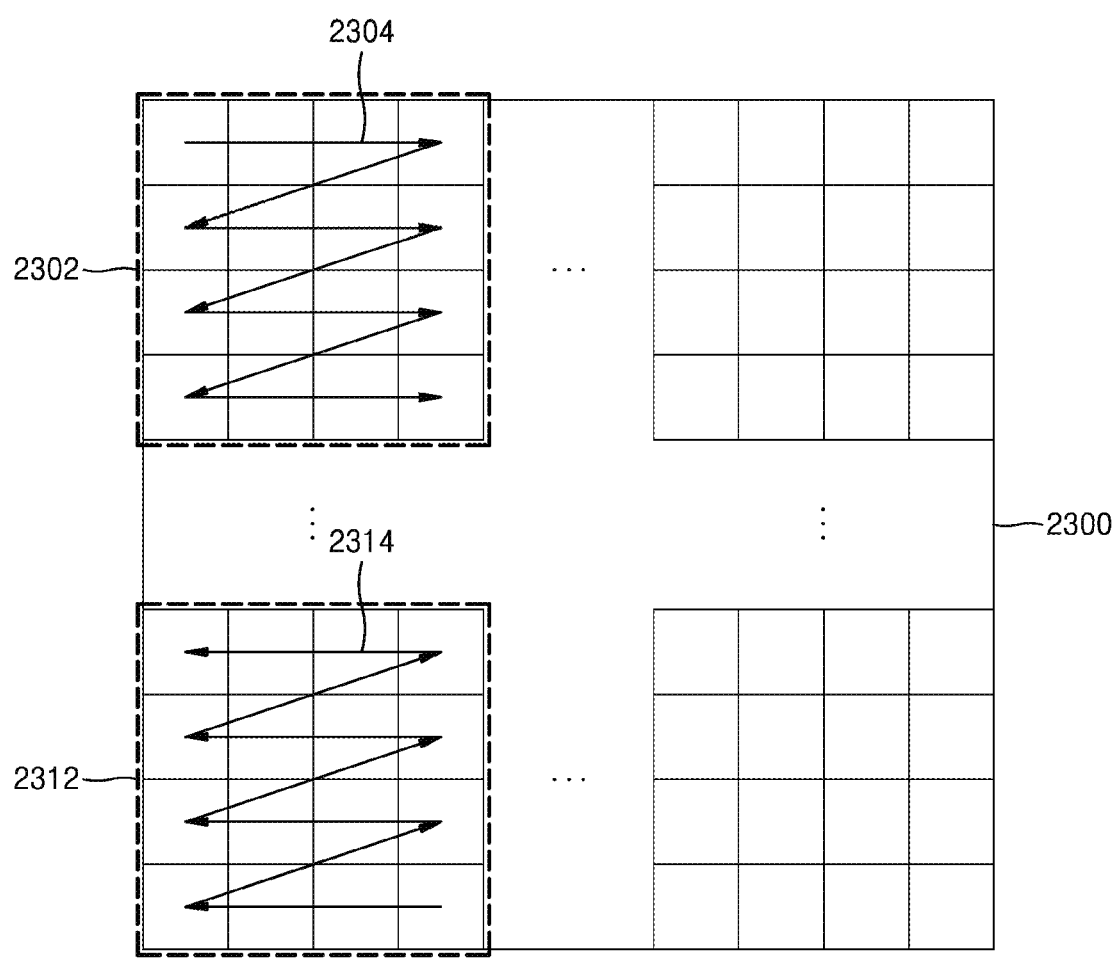
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image decoding apparatus 200 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 200 may obtain processing block size information and may determine the size of one or more processing blocks included in the picture. The image decoding apparatus 200 may obtain the processing block size information from a bitstream and may determine the size of one or more processing blocks included in the picture. The size of processing blocks may be a predetermined size of data units, which is indicated by the processing block size information.

According to an embodiment, the receiver 210 of the image decoding apparatus 200 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image decoding apparatus 200 may determine the size of one or more processing blocks, which are split from the picture, by using the obtained processing block size information. The size of the processing blocks may be integer times that of the reference coding units.

According to an embodiment, the image decoding apparatus 200 may determine the size of processing blocks 2302 and 2312 included in the picture 2300. For example, the image decoding apparatus 200 may determine the size of processing blocks based on the processing block size information obtained from the bitstream. Referring to FIG. 23, according to an embodiment, the image decoding apparatus 200 may determine a width of the processing blocks 2302 and 2312 to be four times the width of the reference coding units, and may determine a height of the processing blocks 2302 and 2312 to be four times the height of the reference coding units. The image decoding apparatus 200 may determine a determination order of one or more reference coding units in one or more processing blocks.

According to an embodiment, the image decoding apparatus 200 may determine the processing blocks 2302 and 2312, which are included in the picture 2300, based on the size of processing blocks, and may determine a determination order of one or more reference coding units in the processing blocks 2302 and 2312. According to an embodiment, determination of reference coding units may include determination of the size of the reference coding units.

According to an embodiment, the image decoding apparatus 200 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 200 may obtain, from the bitstream, the determination order information of reference coding units according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 200 may determine one or more reference coding units based on the determined determination order.

According to an embodiment, the receiver 210 may obtain the determination order information of reference coding units from the bitstream as information related to the processing blocks 2302 and 2312, and the image decoding apparatus 200 may determine a determination order of one or more reference coding units included in the processing blocks 2302 and 2312 and determine one or more reference coding units, which are included in the picture 2300, based on the determination order. Referring to FIG. 23, the image decoding apparatus 200 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included in the processing block 2302 may be determined according to a raster scan order. On the contrary, when the determination order 2314 of reference coding units in the other processing block 2312 is a backward raster scan order, reference coding units included in the processing block 2312 may be determined according to the backward raster scan order.

According to an embodiment, the image decoding apparatus 200 may decode the determined one or more reference coding units. The image decoding apparatus 200 may decode an image, based on the reference coding units determined as described above. A method of decoding the reference coding units may include various image decoding methods.

According to an embodiment, the image decoding apparatus 200 may obtain block shape information indicating the shape of a current coding unit or split shape information indicating a splitting method of the current coding unit, from the bitstream, and may use the obtained information. The block shape information or the split shape information may be included in the bitstream related to various data units. For example, the image decoding apparatus 200 may use the block shape information or the split shape information included in a sequence parameter set, a picture parameter set, a video parameter set, a slice header, or a slice segment header. Furthermore, the image decoding apparatus 200 may obtain, from the bitstream, syntax corresponding to the block shape information or the split shape information according to each largest coding unit, each reference coding unit, or each processing block, and may use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. An image decoding method comprising:
   acquiring image data from a bitstream;
   decoding a projection image of a 360-degree image from the image data;
   converting the projection image into a converted 360-degree image;
   acquiring rotation information of the 360-degree image from the bitstream; and
   rotating the 360-degree image based on the rotation information to reconstruct an original 360-degree image,
   wherein the rotation information indicates an angle difference between the converted 360-degree image and the original 360-degree image,
   wherein the rotation information is total 8 bits including 5 bits representing a horizontal angle and 3 bits representing a vertical angle.

2. The image decoding method of claim 1, wherein the rotation information represents a horizontal angle and a vertical angle with respect to the center of the converted 360-degree image.

3. The image decoding method of claim 1, wherein the rotation information is stored in a video parameter set or a sequence parameter set in the bitstream.

4. The image decoding method of claim 1, wherein the rotation information is stored in supplemental enhancement information (SEI) in the bitstream.

5. The image decoding method of claim 1, further comprising:
acquiring information about a rotation change amount of the converted 360-degree image from the bitstream,
wherein the converted 360-degree image rotates based on the rotation information and the information about the rotation change amount.

6. The image decoding method of claim 5, wherein the information about the rotation change amount is stored in a picture parameter set in the bitstream.

7. The image decoding method of claim 1, further comprising:
acquiring information about whether the converted 360-degree image has rotated; and
determining whether to acquire the rotation information based on the information about whether the converted 360-degree image has rotated.

8. An image decoding apparatus comprising:
a data acquirer configured to acquire image data and rotation information of a 360-degree image from a bitstream;
a decoder configured to decode a projection image of a converted 360-degree image from the image data; and
a reconstructor configured to convert the projection image into the 360-degree image and rotate the 360-degree image based on the rotation information to reconstruct an original 360-degree image,
wherein the rotation information indicates an angle difference between the converted 360-degree image and the original 360-degree image,
wherein the rotation information is total 8 bits including 5 bits representing a horizontal angle and 3 bits representing a vertical angle.

9. An image encoding method comprising:
determining a predetermined angle for rotating an original 360-degree image;
rotating the original 360-degree image based on the predetermined angle;
converting the rotated 360-degree image into a projection image;
encoding the projection image; and
generating a bitstream including image data for the encoded projection image and information about the predetermined angle,
wherein information about the predetermined angle is total 8 bits including 5 bits representing a horizontal angle and 3 bits representing a vertical angle.

10. The image encoding method of claim 9, wherein the predetermined angle includes a horizontal angle and a vertical angle with respect to the center of the rotated 360-degree image.

11. The image encoding method of claim 9, wherein the determining of the predetermined angle for rotating the original 360-degree image comprises:
applying possible rotation angles to the original 360-degree image to rotate the original 360-degree image;
converting the 360-degree image rotated by each of the possible rotation angles into a projection image;
calculating encoding efficiency of the converted projection image; and
determining the predetermined angle from among the possible rotation angles based on a result of the calculation.

12. The image encoding method of claim 9, wherein the projection image is an image obtained by projecting the rotated 360-degree image by using any one of equirectangular projection, icosahedral projection, cubemap projection, octahedron projection, and rotated sphere projection.

13. The image encoding method of claim 9, wherein the information about the predetermined angle is stored in a video parameter set or a sequence parameter set in the bitstream.

* * * * *